US012786596B2

(12) United States Patent
Kato

(10) Patent No.: US 12,786,596 B2
(45) Date of Patent: Nov. 3, 2026

(54) PHOTOELECTRIC CONVERSION DEVICE AND PHOTOELECTRIC CONVERSION SYSTEM

(71) Applicant: CANON KABUSHIKI KAISHA, Tokyo (JP)

(72) Inventor: Satoshi Kato, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 34 days.

(21) Appl. No.: 18/957,029

(22) Filed: Nov. 22, 2024

(65) Prior Publication Data

US 2025/0184638 A1 Jun. 5, 2025

(30) Foreign Application Priority Data

Nov. 30, 2023 (JP) ................................ 2023-203225
Sep. 18, 2024 (JP) ................................ 2024-160779

(51) Int. Cl.
*H04N 25/78* (2023.01)
*H04N 25/51* (2023.01)
(Continued)

(52) U.S. Cl.
CPC ............. *H04N 25/78* (2023.01); *H04N 25/79* (2023.01); *H04N 25/51* (2023.01); *H04N 25/7795* (2023.01)

(58) Field of Classification Search
CPC ........ H04N 25/78; H04N 25/79; H04N 25/51; H04N 25/7795; H10F 39/803; H10F 39/811
See application file for complete search history.

(56) References Cited

U.S. PATENT DOCUMENTS 7,817,199 B2 10/2010 Yamashita
9,267,840 B2 2/2016 Kato
(Continued)

FOREIGN PATENT DOCUMENTS

JP 2009-89078 A 4/2009
JP 2013-51674 A 3/2013
(Continued)

OTHER PUBLICATIONS

U.S. Appl. No. 19/061,363, filed Feb. 24, 2025 by Shinya Ichino.

*Primary Examiner* — Timothy J Henn
(74) *Attorney, Agent, or Firm* — VENABLE LLP

(57) ABSTRACT

The photoelectric conversion device includes first and second substrates bonded to each other, a plurality of pixel circuits provided on the first substrate so as to form a plurality of columns and each outputting a signal based on charge generated by photoelectric conversion, a plurality of column circuits provided on the second substrate and each performing a gain processing on an output signal from the corresponding pixel circuit, a standard signal output unit provided on the second substrate and outputting a standard signal according to the gain processing, a connection portion electrically connecting the first substrate and the second substrate, and a signal output unit including an amplifier circuit provided on the first substrate. The signal output unit outputs a signal based on the standard signal input from the standard signal output unit via the connection portion to the plurality of column circuits via the amplifier circuit.

20 Claims, 22 Drawing Sheets

(51) Int. Cl.
*H04N 25/76* (2023.01)
*H04N 25/79* (2023.01)

(56) References Cited

U.S. PATENT DOCUMENTS

| | | | | |
|---|---|---|---|---|
| 9,813,681 | B2 | 11/2017 | Kato | |
| 9,966,395 | B2 | 5/2018 | Kato | |
| 10,116,854 | B2 | 10/2018 | Kato | |
| 11,218,654 | B2 | 1/2022 | Suzuki | |
| 11,800,253 | B2 | 10/2023 | Saito | |
| 2008/0042046 | A1* | 2/2008 | Mabuchi | H10F 39/809 257/E27.151 |
| 2013/0033632 | A1* | 2/2013 | Kishi | H04N 25/767 348/308 |
| 2013/0228673 | A1* | 9/2013 | Hashimoto | H04N 23/76 250/208.1 |
| 2013/0314573 | A1* | 11/2013 | Tsukimura | H04N 25/616 348/302 |
| 2019/0313047 | A1 | 10/2019 | Ikeda | |
| 2020/0194472 | A1* | 6/2020 | Inoue | H10F 39/8033 |
| 2022/0086383 | A1* | 3/2022 | Shigiya | H04N 25/79 |
| 2022/0247964 | A1* | 8/2022 | Kobayashi | H04N 25/616 |
| 2023/0262353 | A1* | 8/2023 | Kobayashi | H04N 25/78 348/297 |

FOREIGN PATENT DOCUMENTS

| | | | |
|---|---|---|---|
| JP | 2018-64199 | A | 4/2018 |
| JP | 2019-41419 | A | 3/2019 |

* cited by examiner

PHOTOELECTRIC CONVERSION DEVICE AND PHOTOELECTRIC CONVERSION SYSTEM

BACKGROUND OF THE INVENTION

Field of the Invention

The present invention relates to a photoelectric conversion device and a photoelectric conversion system.

Description of the Related Art

In recent years, a stacked-type image sensor configured by forming a pixel substrate on which pixels are arranged and a signal processing substrate on which a peripheral circuit unit is arranged on different semiconductor substrates and bonding these substrates has become widespread. Japanese Patent Application Laid-Open No. 2013-051674 describes an imaging device in which a pixel array arranged on a pixel substrate and a column circuit arranged on a signal processing substrate are disposed at positions overlapping each other in order to suppress an increase in chip area and to suppress in-plane nonuniformity of dark current due to heat generation of a peripheral circuit without deteriorating pixel performance.

However, in the imaging device described in Japanese Patent Application Laid-Open No. 2013-051674, the characteristics may be degraded due to a difference in nonlinearity of a circuit corresponding to a difference in characteristics between a circuit of a pixel substrate and a circuit of a signal processing substrate fabricated by using different process technologies.

SUMMARY OF THE INVENTION

An object of the present invention is to provide a technique for improving characteristics in a photoelectric conversion device configured by bonding a first substrate provided with a pixel circuit and a second substrate.

According to one disclosure of the present specification, there is provided a photoelectric conversion device including a first substrate, a second substrate bonded to the first substrate, a plurality of pixel circuits provided on the first substrate so as to form a plurality of columns, each of the plurality of pixel circuits being configured to output a signal based on charge generated by photoelectric conversion, a plurality of column circuits provided on the second substrate, each of the plurality of column circuits being configured to perform a gain processing on an output signal from the corresponding pixel circuit, a standard signal output unit provided on the second substrate and configured to output a standard signal according to the gain processing, a connection portion electrically connecting the first substrate and the second substrate, and a signal output unit including an amplifier circuit provided on the first substrate, wherein the signal output unit is configured to output a signal based on the standard signal input from the standard signal output unit via the connection portion to the plurality of column circuits via the amplifier circuit.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

In the present specification, even when the ratio of the output voltage to the input voltage is 1 or less, this ratio is expressed as "gain". Signal processing with a gain of 1 or less is also included in "amplification". That is, what is generally called "buffering" (gain is about 1) or "attenuation" (gain is less than 1) is also included in "amplification".

First Embodiment

Figure 1:
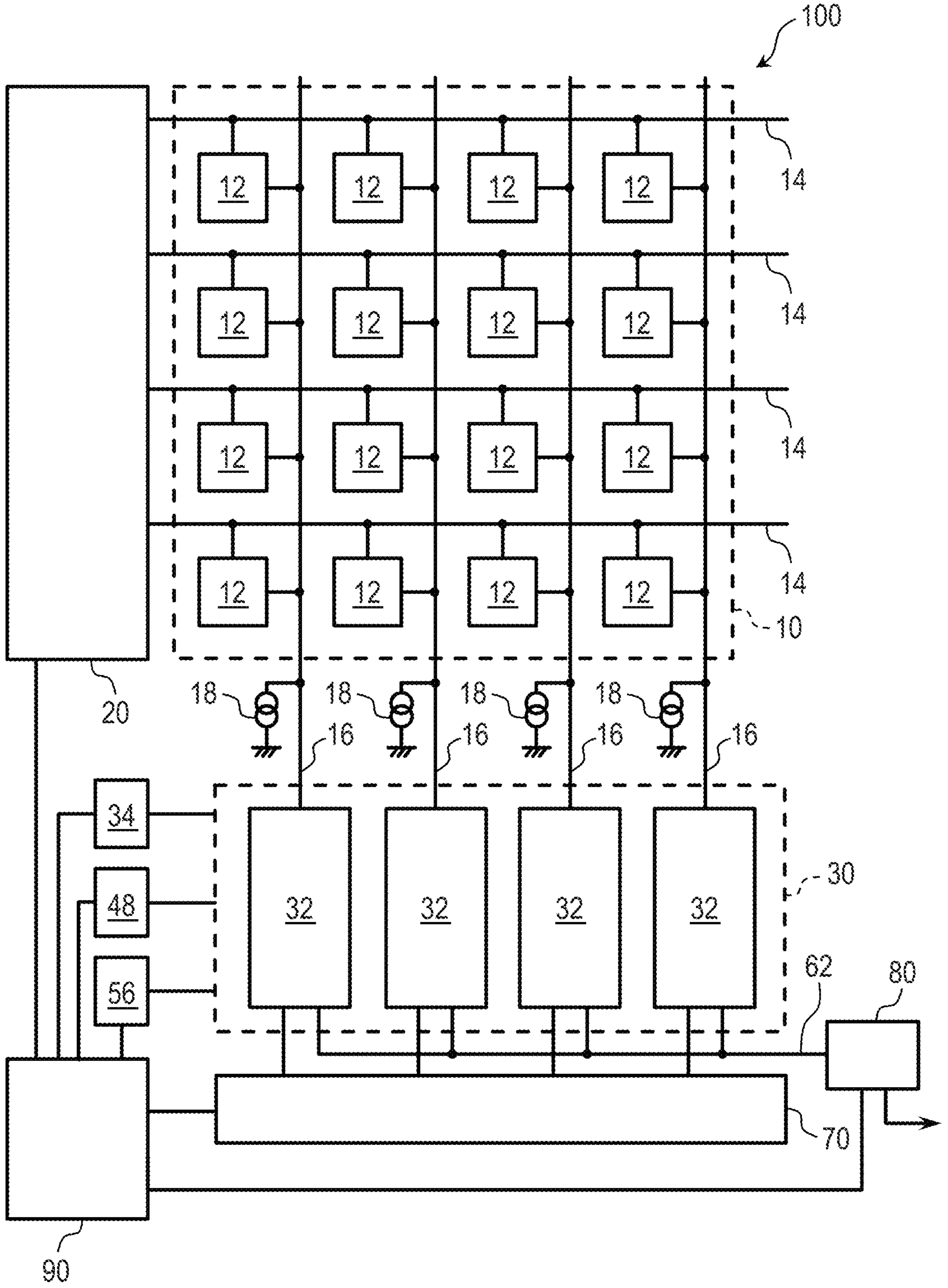
FIG. 1 is a block diagram illustrating a schematic configuration of a photoelectric conversion device according to a first embodiment.
Figure 2:
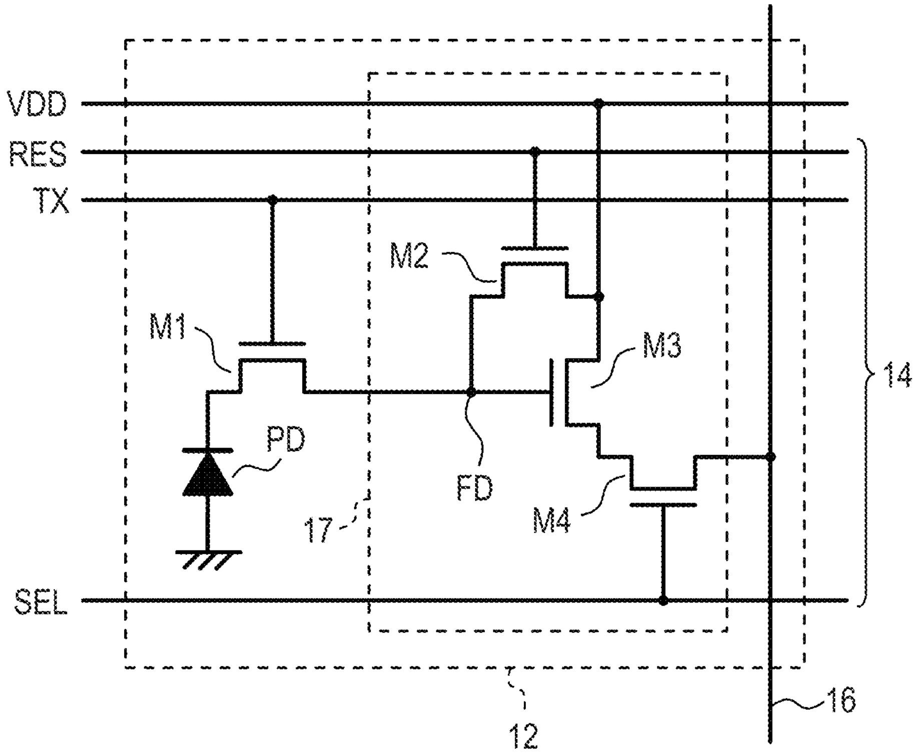
FIG. 2 is an equivalent circuit diagram illustrating a configuration example of a pixel of the photoelectric conversion device according to the first embodiment.
Figure 3:
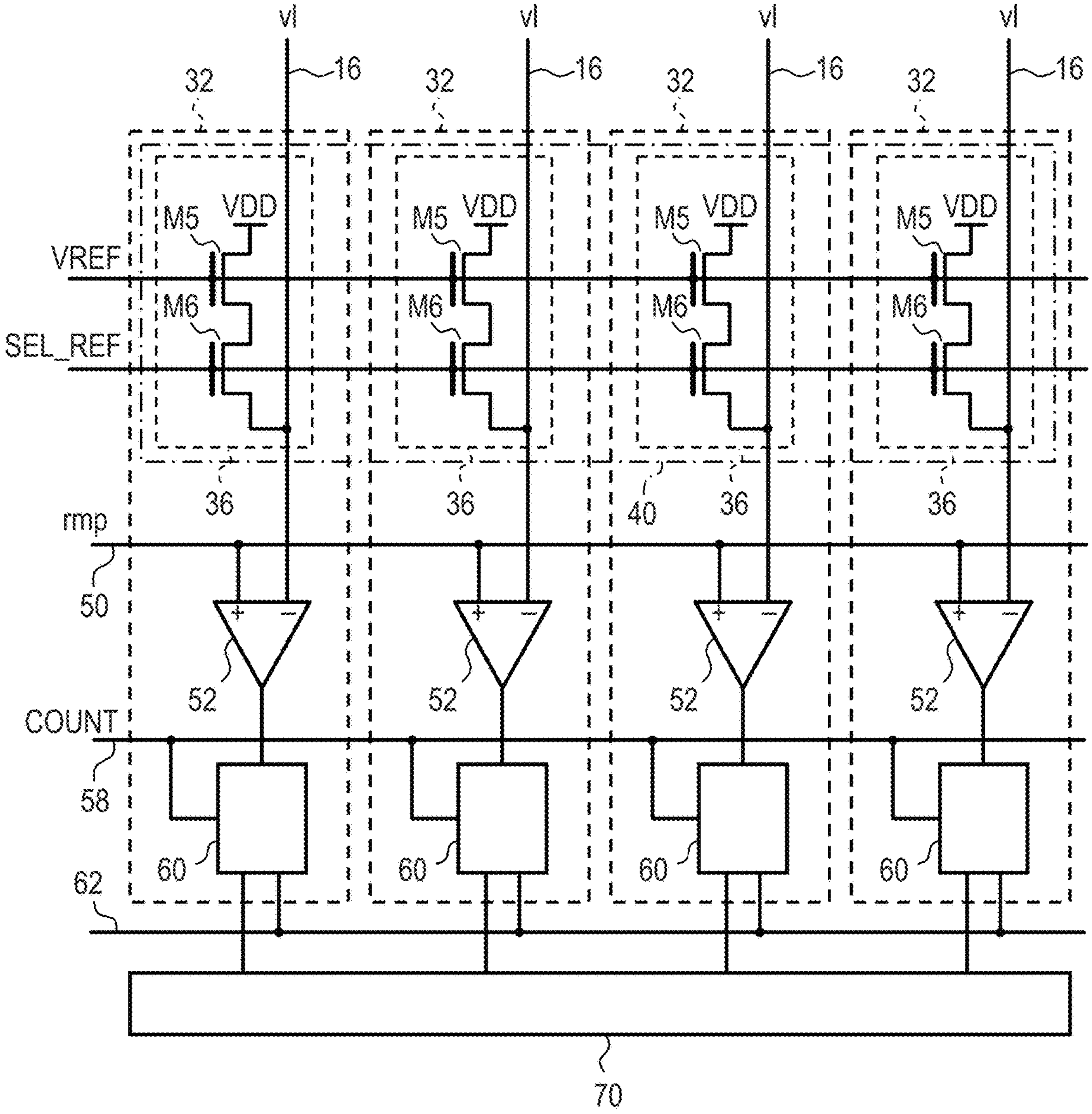
FIG. 3 is an equivalent circuit diagram illustrating a configuration example of a column circuit of the photoelectric conversion device according to the first embodiment.
Figure 4:
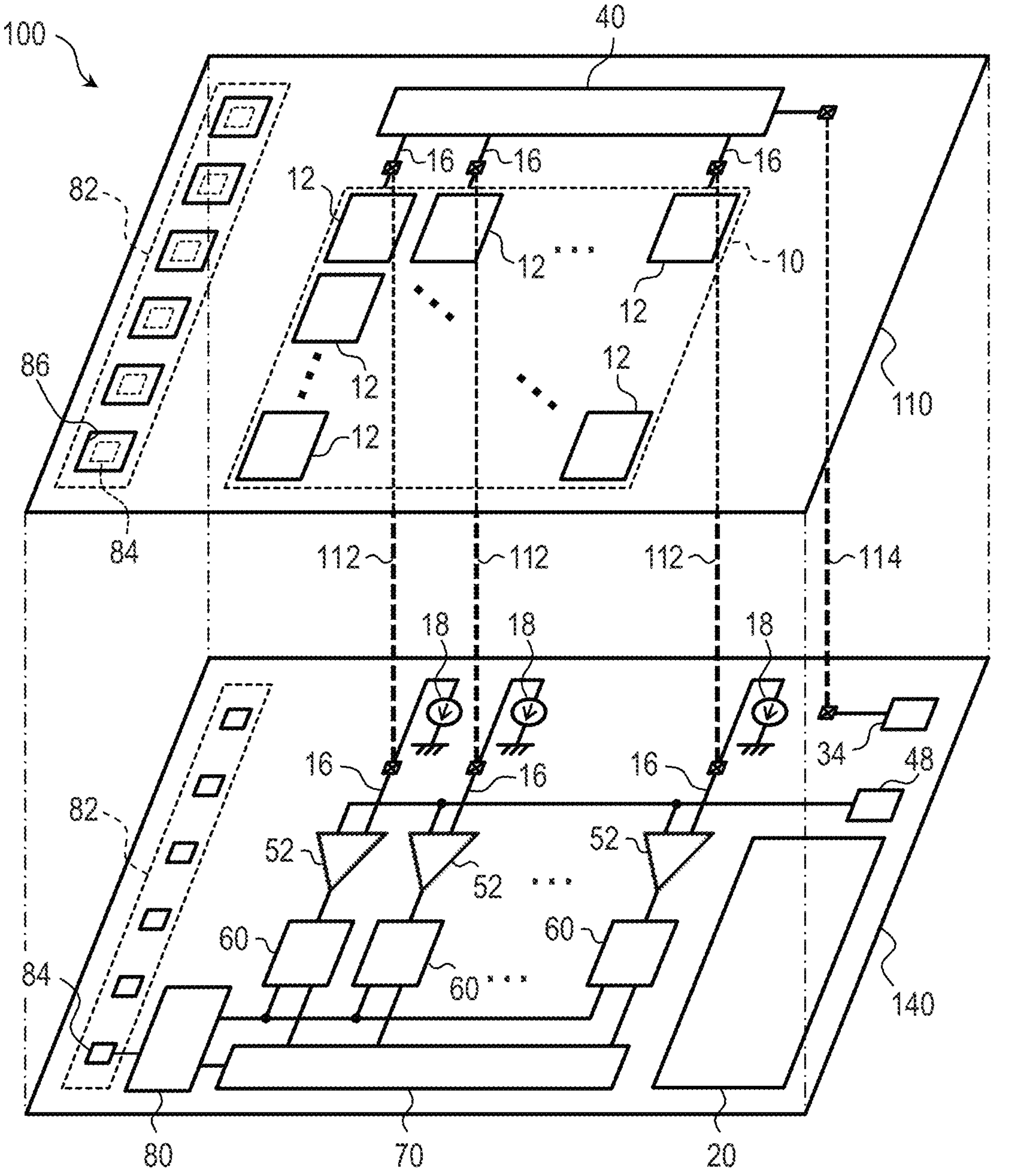
FIG. 4 and FIG. 5 are schematic diagrams illustrating a configuration example of the photoelectric conversion device according to the first embodiment.
Figure 5:
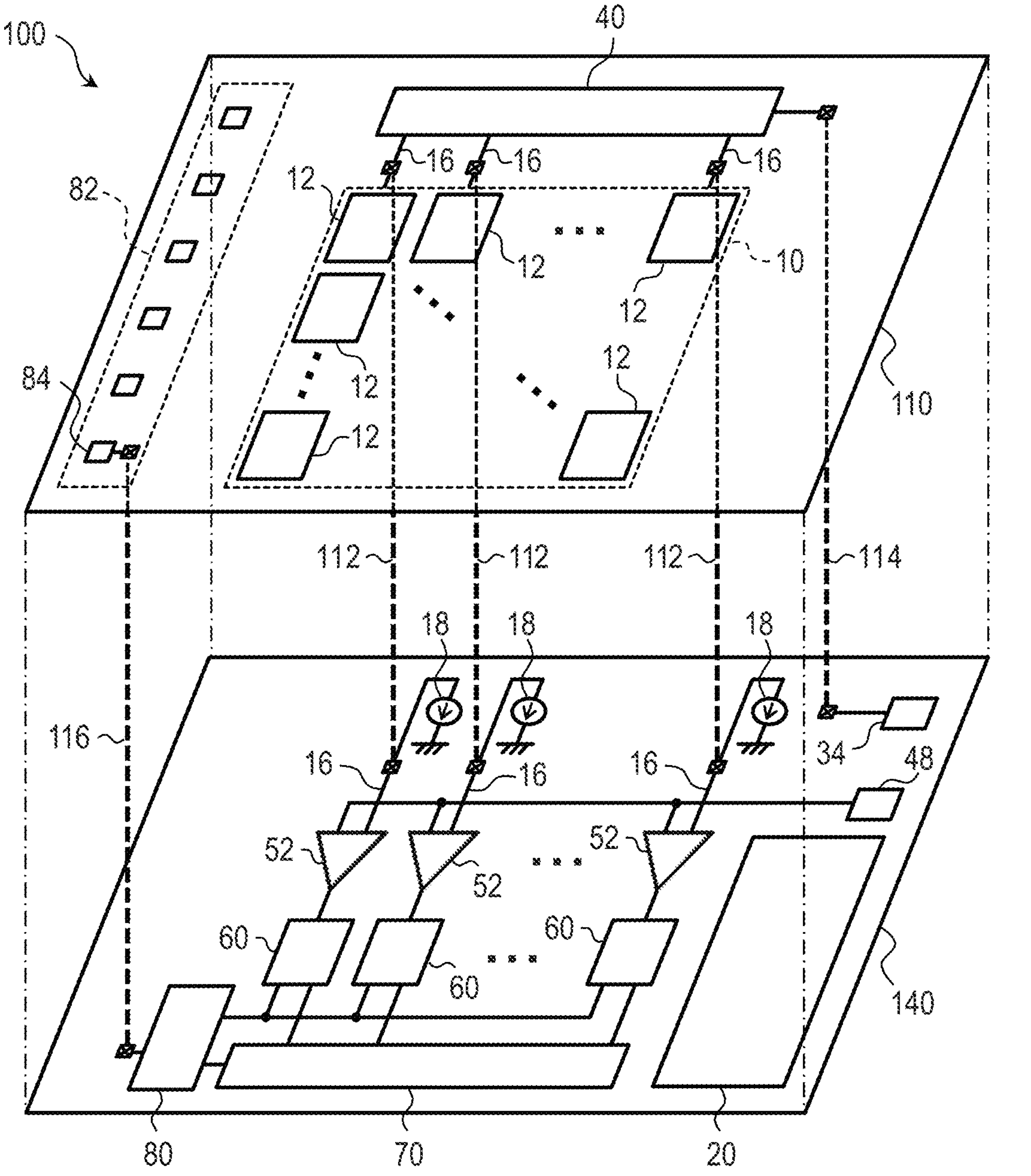
Figure 6:
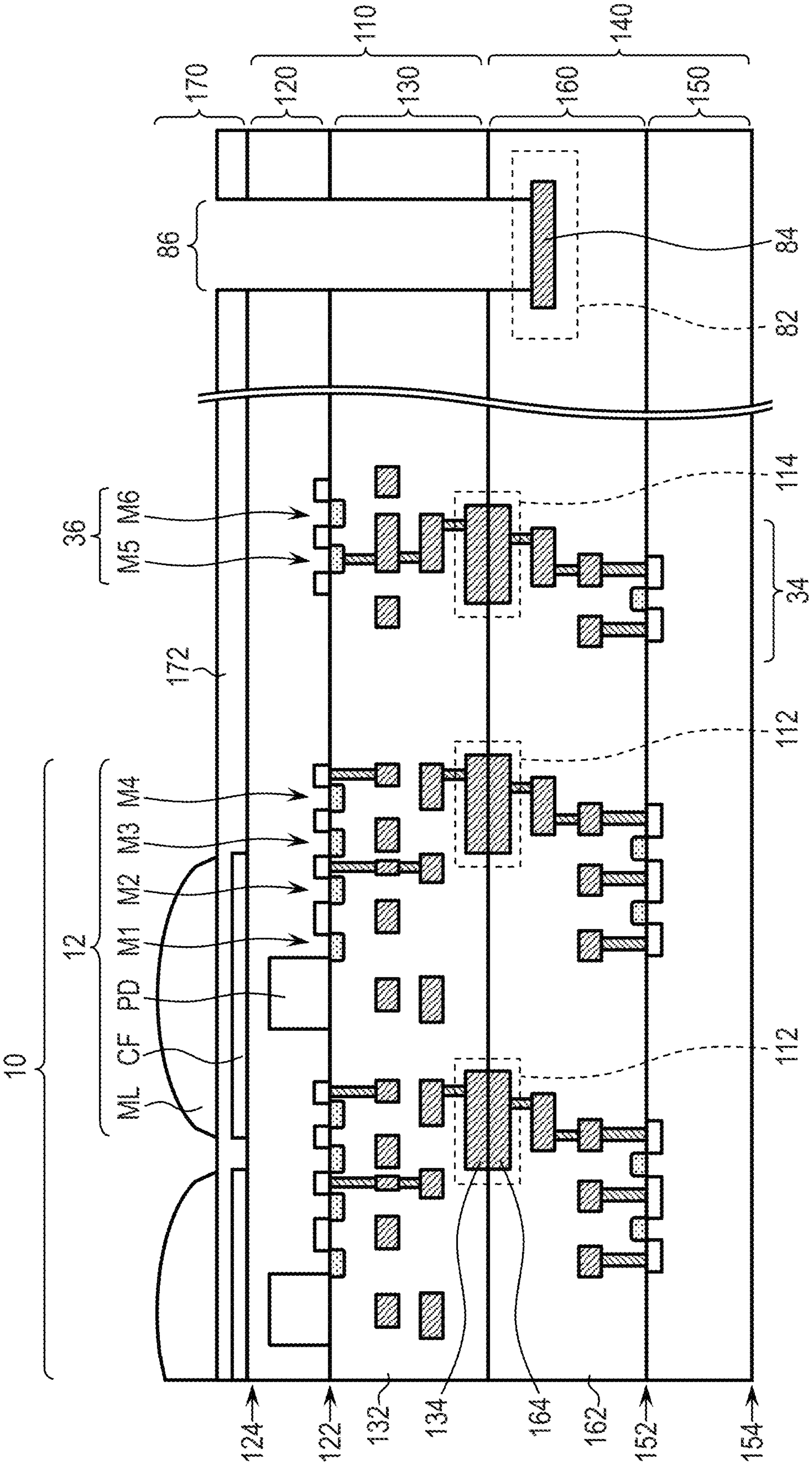
FIG. 6 and FIG. 7 are schematic cross-sectional views illustrating a configuration example of the photoelectric conversion device according to the first embodiment.
Figure 7:
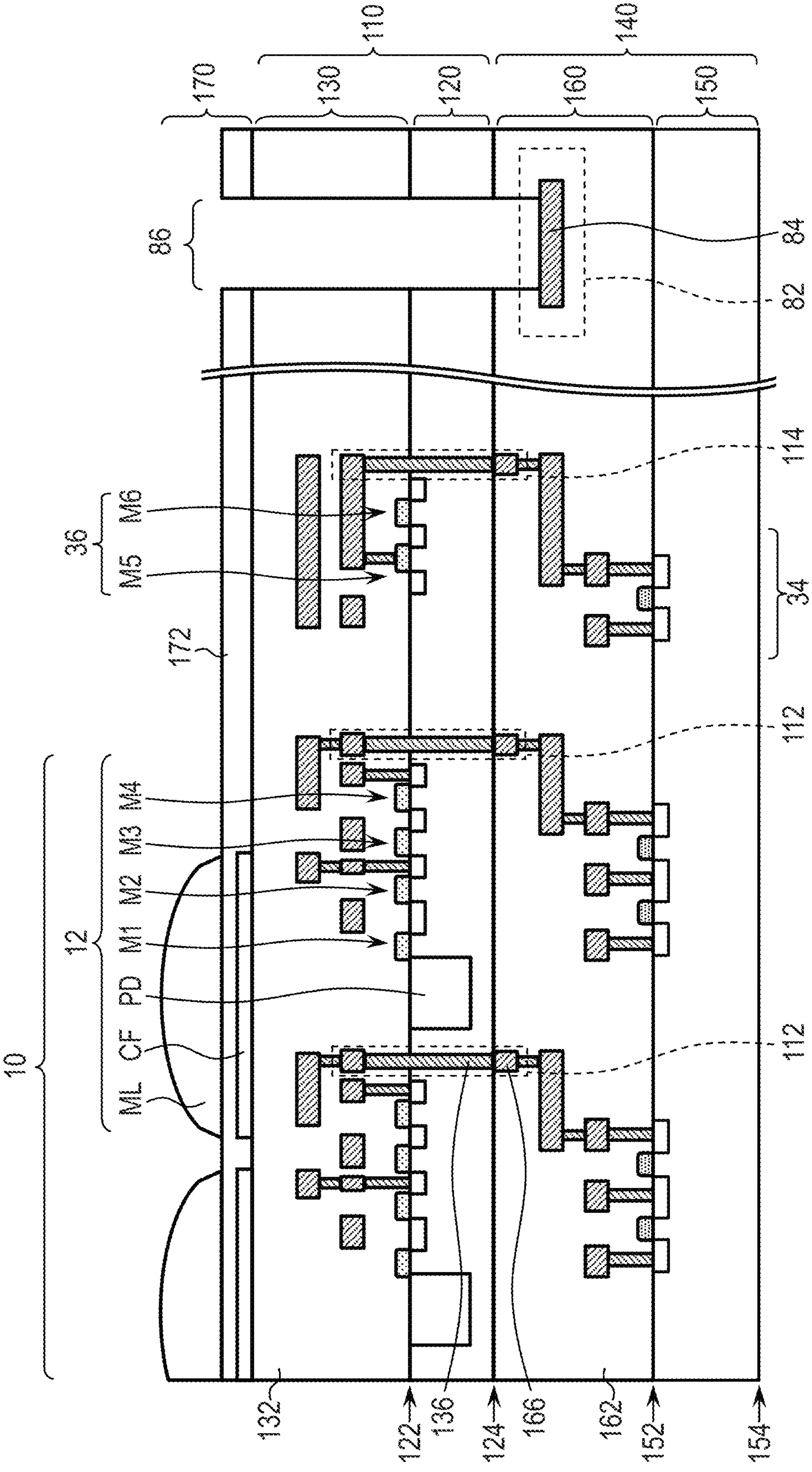
Figure 8:
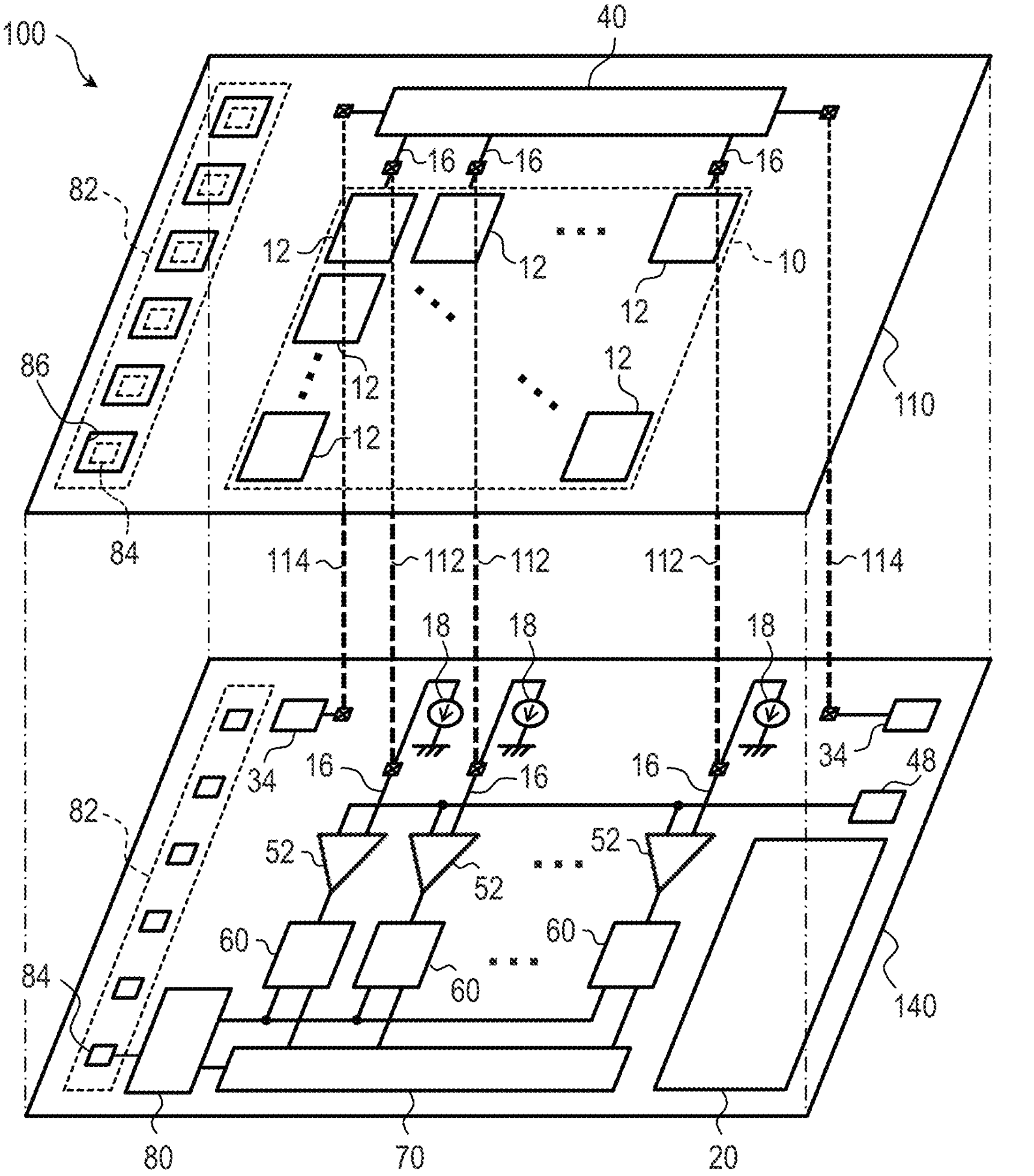
FIG. 8 is a schematic diagram illustrating a configuration example of a photoelectric conversion device according to a modification of the first embodiment.

A photoelectric conversion device and a method of driving the same according to a first embodiment of the present invention will be described with reference to FIG. 1 to FIG. 8. FIG. 1 is a block diagram illustrating a schematic configuration of a photoelectric conversion device according to the present embodiment. FIG. 2 is an equivalent circuit diagram illustrating a configuration example of a pixel of the photoelectric conversion device according to the present embodiment. FIG. 3 is an equivalent circuit diagram illustrating a configuration example of a column circuit of the photoelectric conversion device according to the present embodiment. FIG. 4 and FIG. 5 are schematic diagrams illustrating a configuration example of the photoelectric conversion device according to the present embodiment. FIG. 6 and FIG. 7 are schematic cross-sectional views illustrating a configuration example of the photoelectric conversion device according to the present embodiment. FIG. 8 is a schematic diagram illustrating a configuration example of a photoelectric conversion device according to a modification of the present embodiment.

First, a schematic configuration of a photoelectric conversion device according to the present embodiment will be described with reference to FIG. 1. As illustrated in FIG. 1, the photoelectric conversion device 100 includes a pixel array unit 10, a vertical scanning circuit 20, a readout circuit 30, a horizontal scanning circuit 70, a signal processing circuit 80, and a timing generation unit 90. The photoelectric conversion device 100 further includes a current source 18, a standard signal output circuit 34, a reference signal output circuit 48, and a counter circuit 56.

The pixel array unit 10 is provided with a plurality of pixels 12 arranged in a matrix over a plurality of rows and a plurality of columns. Each pixel 12 includes a photoelectric conversion unit including a photoelectric conversion element such as a photodiode, and outputs a pixel signal according to the amount of incident light. Although FIG. 1 illustrates a total of 16 pixels 12 arranged in four rows and four columns, typically, tens of millions of pixels 12 are arranged in the pixel array unit 10. The number of rows and the number of columns of the pixel array arranged in the pixel array unit 10 are not particularly limited. In addition to effective pixels that output pixel signals according to the amount of incident light, the pixel array unit 10 may include an optical black pixel in which photoelectric conversion unit is shielded from light, a dummy pixel that does not output a signal, and the like.

In each row of the pixel array unit 10, a control line 14 is arranged so as to extend in a first direction (lateral direction in FIG. 1). The control line 14 of the respective rows is connected to the pixels 12 arranged in the first direction on the corresponding row and forms a signal line common to these pixels 12. The first direction in which the control lines 14 extend may be referred to as a row direction or a horizontal direction. The control lines 14 are connected to the vertical scanning circuit 20. The control line 14 in each row may include a plurality of signal lines.

In each column of the pixel array unit 10, a signal output line 16 is arranged so as to extend in a second direction (vertical direction in FIG. 1) intersecting the first direction. The signal output line 16 of the respective columns is connected to the pixels 12 arranged in the second direction on the corresponding column and forms a signal line common to these pixels 12. The second direction in which the signal output line 16 extends may be referred to as a column direction or a vertical direction. The signal output lines 16 are connected to the readout circuit 30. A current source 18 is connected to the signal output line 16 of each column. A plurality of signal output lines 16 may be arranged in each column of the pixel array unit 10.

The vertical scanning circuit 20 has a function of generating a control signal for driving the pixels 12 in response to a control signal from the timing generation unit 90 and outputting the generated control signal to the pixels 12 via the control line 14. A logic circuit such as a shift register, or an address decoder may be used as the vertical scanning circuit 20. The vertical scanning circuit 20 sequentially outputs the control signals to the control lines 14 of the respective rows, and sequentially drives the pixels 12 of the pixel array unit 10 in units of rows. The signals read out from the pixels 12 in units of rows are input to the readout circuit 30 via the signal output lines 16 arranged in respective columns of the pixel array unit 10.

The readout circuit 30 includes a plurality of column circuits 32 connected to each of the plurality of signal output lines 16 arranged in the pixel array unit 10. Each of the plurality of column circuits 32 has a function of performing predetermined gain processing on the output signal of the pixel 12 in the corresponding column. In the present embodiment, each of the plurality of column circuits 32 has a function of performing analog-to-digital conversion (AD conversion) on a pixel signal output from the pixel 12 connected to the corresponding signal output line 16 and holding digital data that is a result of the AD conversion on the pixel signal. A horizontal scanning circuit 70 and a horizontal output line 62 are connected to each of the plurality of column circuits 32. The standard signal output circuit 34, the reference signal output circuit 48, and the counter circuit 56 are connected to the readout circuit 30.

The standard signal output circuit 34 has a function of outputting a standard signal VREF serving as a basis of correction value calculation for performing correction processing such as gain error correction performed in the signal processing circuit 80. The standard signal output circuit 34 controls the voltage value of the standard signal VREF in accordance with the degree of change in the signal level of a reference signal rmp output from the reference signal output circuit 48. In this specification, a functional block including the standard signal output circuit 34 may be referred to as a standard signal output unit.

The reference signal output circuit 48 has a function of outputting the reference signal rmp used for AD conversion to the column circuit 32 of each column. The reference signal rmp used for AD conversion may have a predetermined amplitude according to the range of the pixel signal and may be a signal whose level changes with time. Although the reference signal rmp is not particularly limited, for example, a ramp signal whose level monotonically increases or monotonically decreases with time may be applied. Note that the change in the signal level of the reference signal rmp does not necessarily have to be continuous and may be stepwise. In addition, the change in the signal level of the reference signal rmp is not necessarily linear with respect to time and may be curved with respect to time (for example, a sine wave or a cosine wave). In this specification, a functional block including the reference signal output circuit 48 may be referred to as a reference signal output unit.

The counter circuit 56 has a function of counting a clock pulse signal CLK supplied from a clock pulse supply unit (not illustrated) and outputting a count signal indicating a count value to the column circuits 32. The counter circuit 56 starts the counting operation in synchronization with the timing at which the change in the signal level of the reference signal output from the reference signal output circuit 48 starts. Note that each of the column circuits 32 may have the function of the counter circuit 56.

The horizontal scanning circuit 70 has a function of generating a control signal for reading out a pixel signal from the column circuit 32 of the readout circuit 30 in response to a control signal from the timing generation unit 90 and outputting the generated control signal to the readout circuit 30. The horizontal scanning circuit 70 sequentially scans the column circuits 32 of the respective columns of the readout circuit 30, and sequentially outputs the pixel signals held in the respective memories to the signal processing circuit 80 via the horizontal output line 62. A logic circuit such as a shift register, or an address decoder may be used as the horizontal scanning circuit 70.

The signal processing circuit 80 may be comprised of a buffer amplifier, a differential amplifier, and the like, and is a processing circuit that performs predetermined signal processing on a pixel signal of a column selected by the horizontal scanning circuit 70 and outputs the processed pixel data. Examples of the signal processing performed in the signal processing circuit 80 include correction processing such as correction of a gain error in the column circuit. The external interface circuit included in the signal processing circuit 80 is not particularly limited. As the external interface circuit, for example, a SerDes (SERializer/DESerializer) transmission circuit may be applied. The SerDes transmission circuit is, for example, a LVDS (Low Voltage Differential Signaling) circuit or a SLVS (Scalable Low Voltage Signaling) circuit.

The timing generation unit 90 is a control circuit for outputting control signals for controlling operations and timings of the vertical scanning circuit 20, the standard signal output circuit 34, the reference signal output circuit 48, the counter circuit 56, the horizontal scanning circuit 70, the signal processing circuit 80, and the like, and supplying the control signals to the respective functional blocks. At least a part of the control signals supplied to these functional blocks may be supplied from the outside of the photoelectric conversion device 100.

Each of the pixels 12 included in the pixel array unit 10 includes, as illustrated in, e.g., FIG. 2, a photoelectric conversion element PD, a transfer transistor M1, and a pixel circuit 17. The pixel circuit 17 may include a reset transistor M2, an amplifier transistor M3, and a select transistor M4. This embodiment will be described based on a mode in which the photoelectric conversion element PD, the transfer transistor M1, and the pixel circuit 17 are provided on the same substrate. However, as described later, the photoelectric conversion element PD and the pixel circuit 17 may be provided on different substrates.

The photoelectric conversion element PD may be, for example, a photodiode. The photoelectric conversion element PD has an anode connected to the ground voltage node and a cathode connected to a source of the transfer transistor M1. A drain of the transfer transistor M1 is connected to a source of the reset transistor M2 and a gate of the amplifier transistor M3. The node FD to which the drain of the transfer transistor M1, the source of the reset transistor M2, and the gate of the amplifier transistor M3 are connected is a so-called floating diffusion. The floating diffusion includes a capacitance component (floating diffusion capacitance) and has a function as a charge holding portion. The floating diffusion capacitance may include a gate capacitance of the transistor, a p-n junction capacitance, an interconnection capacitance, and the like. A drain of the reset transistor M2 and a drain of the amplifier transistor M3 are connected to a node to which a power supply voltage (voltage VDD) is supplied. A source of the amplifier transistor M3 is connected to a drain of the select transistor M4. A source of the select transistor M4 is connected to the signal output line 16.

In the case of the pixel configuration of FIG. 2, the control line 14 of each row includes three signal lines including a signal line connected to the gate of the transfer transistor M1, a signal line connected to the gate of the reset transistor M2, and a signal line connected to the gate of the select transistor M4. The control signal TX is supplied from the vertical scanning circuit 20 to the gate of the transfer transistor M1. A control signal RES is supplied from the vertical scanning circuit 20 to the gate of the reset transistor M2. The control signal SEL is supplied from the vertical scanning circuit 20 to the gate of the select transistor M4. When each transistor is formed of an n-channel MOS transistor, the corresponding transistor is turned on when a high-level control signal is supplied from the vertical scanning circuit 20. When a low-level control signal is supplied from the vertical scanning circuit 20, the corresponding transistor is turned off.

The present embodiment will be described on the assumption that electrons among electron-hole pairs generated in the photoelectric conversion element PD by light incidence are used as a signal charge. When electrons are used as the signal charge, each transistor constituting the pixel 12 may be formed of an n-channel MOS transistor. However, the signal charge is not limited to electrons, and holes may be used as the signal charge. When holes are used as the signal charge, the conductivity type of each transistor may be opposite to that described in the present embodiment. The names of the source and the drain of the MOS transistor may vary depending on the conductivity type of the transistor and the function of the transistor. Some or all of the names of the source and the drain used in the present embodiment may be referred to as reverse names.

The photoelectric conversion element PD converts (photoelectrically converts) the incident light into charge of an amount corresponding to the amount of the incident light and accumulates the generated charge. The transfer transistor M1 transfers the charge held by the photoelectric conversion element PD to the node FD by turning on. The charge transferred from the photoelectric conversion element PD is held by the capacitance component (floating diffusion capacitance) of the node FD. As a result, the node FD has a potential corresponding to the amount of charge transferred from the photoelectric conversion element PD by charge-voltage conversion by the floating diffusion capacitance.

The reset transistor M2 has a function of controlling a reset operation for resetting the node FD as a charge holding unit. That is, the reset transistor M2 is a reset unit that resets the node FD to a voltage corresponding to the voltage VDD by turning on.

The select transistor M4 connects the amplifier transistor M3 to the signal output line 16 by turning on. The amplifier transistor M3 has the drain to which the voltage VDD is supplied and the source to which the bias current is supplied from the current source 18 via the select transistor M4 and constitutes an amplification unit (source follower circuit) having the gate as an input node. Accordingly, the amplifier transistor M3 outputs a signal based on the potential of the node FD to the signal output line 16 via the select transistor M4. In this sense, the amplifier transistor M3 and the select transistor M4 are output units that output a pixel signal according to the amount of charge held in the node FD.

Each of the column circuits 32 included in the readout circuit 30 may include a standard signal output circuit 36, a comparator 52, and a memory 60, as illustrated in, e.g., FIG. 3. The standard signal output circuit 36 includes an amplifier circuit. For example, the standard signal output circuit 36 may include an amplifier transistor M5 and a select transistor M6. The comparator 52 may be configured by, e.g., a differential amplifier circuit, and includes two input nodes and one output node. The memory 60 has three input nodes and one output node. In this specification, the standard signal output circuits 36 of the plurality of column circuits 32 constituting the readout circuit 30 may be collectively referred to as a standard signal output unit 40.

A drain of the amplifier transistor M5 is connected to a node to which a power supply voltage (voltage VDD) is supplied. A source of the amplifier transistor M5 is connected to a drain of the select transistor M6. A source of the select transistor M6 is connected to the signal output line 16. The standard signal VREF is supplied from the standard signal output circuit 34 to a gate of the amplifier transistor M5. A control signal SEL_REF is supplied from the timing generation unit 90 to a gate of the select transistor M6.

The select transistor M6 connects the amplifier transistor M5 to the signal output line 16 by turning on. The amplifier transistor M5 has the drain to which the voltage VDD is supplied and the source to which the bias current is supplied from the current source 18 via the select transistor M6 and constitutes an amplification unit (source follower circuit) having the gate as an input node. Accordingly, the amplifier transistor M5 outputs a signal based on the potential of the standard signal VREF to the signal output line 16 via the select transistor M6.

A first input node of the comparator 52 (for example, an inverting input node (−) of the differential amplifier circuit) is connected to the corresponding signal output line 16. A second input node of the comparator 52 (for example, a non-inverting input node (+) of the differential amplifier circuit) is connected to the reference signal output circuit 48 via the reference signal line 50. An output node of the comparator 52 is connected to a first input node of the memory 60. A second input node of the memory 60 is connected to the counter circuit 56 via the count signal line 58. A third input node of the memory 60 is connected to the horizontal scanning circuit 70. An output node of the memory 60 is connected to the signal processing circuit 80 via a horizontal output line 62.

The comparator 52 compares a level of a voltage v1 of the signal output line 16 with a level of the reference signal rmp output from the reference signal line 50, and outputs a signal according to the comparison result. For example, the comparator 52 outputs a high-level signal when the level of the reference signal rmp is lower than the level of the voltage v1. When the level of the reference signal rmp is higher than the level of the voltage v1, the comparator 52 outputs a low-level signal. The relationship between the magnitude relationship of the input signals and the level of the output signal may be reversed.

The memory 60 holds the count value indicated by the count signal COUNT output from the counter circuit 56 at a timing when the signal level of the output node of the comparator 52 is inverted as digital data of the pixel signal. The digital data held in the memory 60 is sequentially transferred to the signal processing circuit 80 via the horizontal output line 62 for each column in accordance with the control signal from the horizontal scanning circuit 70.

The photoelectric conversion device 100 according to the present embodiment is configured as a stacked-type photoelectric conversion device in which the above-described functional blocks are separately formed on a plurality of substrates, and these substrates are bonded and electrically connected. FIG. 4 is a schematic diagram illustrating a case where the photoelectric conversion device 100 is configured by stacking the pixel substrate 110 and the signal processing substrate 140. By arranging the pixel array unit 10 on a substrate different from the other substrate provided with the other functional blocks, it is possible to reduce the size of the photoelectric conversion device 100 without sacrificing the area of the pixel array unit 10.

For example, the pixel array unit 10 and the standard signal output unit 40 may be disposed on the pixel substrate 110. For example, the current source 18, the vertical scanning circuit 20, the standard signal output circuit 34, the reference signal output circuit 48, the comparator 52, the counter circuit 56, the memory 60, the horizontal scanning circuit 70, the signal processing circuit 80, and the timing generation unit 90 may be disposed on the signal processing substrate 140.

The pixels 12 and the standard signal output circuit 36 disposed on the pixel substrate 110 are electrically connected to the current source 18 and the comparator 52 disposed on the signal processing substrate 140 via a connection portion 112. A node including the connection portion 112 corresponds to the signal output line 16. The standard signal output unit 40 disposed on the pixel substrate 110 and the standard signal output circuit 34 disposed on the signal processing substrate 140 are electrically connected to each other via a connection portion 114.

A pad region 82 is provided at each edge of the pixel substrate 110 and the signal processing substrate 140. A plurality of pad electrodes 84 are provided in the pad region 82 of the signal processing substrate 140. A plurality of pad openings 86 penetrating the pixel substrate 110 are provided in the pad region 82 of the pixel substrate 110. The plurality of pad openings 86 is provided so that each of the pad electrodes 84 of the signal processing substrate 140 is exposed inside the pad opening 86 when the pixel substrate 110 is stacked on the signal processing substrate 140. Wirings for supplying power from an external device to the photoelectric conversion device 100 and inputting and outputting signals therebetween are connected to the pad electrodes 84 through the pad openings 86 using, for example, a wire bonding technique. In the pad region 82, an output circuit for outputting a signal from the signal processing circuit 80 to the outside of the photoelectric conversion device 100, an ESD (Electro-Static Discharge) protection circuit (both of which are not illustrated), and the like may be further provided.

Although the pad electrodes 84 are provided on the signal processing substrate 140 in the configuration example of FIG. 4, the pad electrodes 84 may be provided on the pixel substrate 110 side as in the configuration example illustrated in FIG. 5, for example. In this case, for example, an output signal from the signal processing circuit 80 disposed on the signal processing substrate 140 may be transmitted to the pixel substrate 110 via a connection portion 116 and output from the pad electrode 84 disposed on the pixel substrate

110. Electrical paths to other pad electrodes 84 of power supply voltages and signals used on the side of the signal processing substrate 140 may be similarly provided.

Two configuration examples of the connection portions 112, 114, and 116 will be described below. FIG. 6 is a configuration example in a case where the signal processing substrate 140 and the pixel substrate 110 are bonded to each other by face-to-face bonding, and FIG. 7 is a configuration example in a case where the signal processing substrate 140 and the pixel substrate 110 are bonded to each other by face-to-back bonding. However, the configurations of the connection portions 112, 114, and 116 are not limited thereto.

In FIG. 6, the pixel substrate 110 includes a semiconductor substrate 120 having a first face 122 and a second face 124, and an interconnection structure layer 130 disposed on a side of the first face 122 of the semiconductor substrate 120. The pixel array unit 10 including the plurality of pixels 12 and the standard signal output circuit 36 are provided on the first face 122 of the semiconductor substrate 120. The interconnection structure layer 130 includes a plurality of interconnection layers disposed in the insulating layer 132. The plurality of interconnection layers constitutes a predetermined circuit constituting the pixel array unit 10 and the standard signal output circuit 36. Among the interconnection layers constituting the interconnection structure layer 130, the uppermost-level interconnection layer farthest from the semiconductor substrate 120 is the Cu interconnection layer 134.

The signal processing substrate 140 includes a semiconductor substrate 150 having a first face 152 and a second face 154, and an interconnection structure layer 160 disposed on a side of the first face 152 of the semiconductor substrate 150. In addition to the standard signal output circuit 34, predetermined functional blocks excluding the pixel array unit 10 and the standard signal output circuit 36 are provided on the first face 152 of the semiconductor substrate 150. The interconnection structure layer 160 includes a plurality of interconnection layers disposed in the insulating layer 162. The plurality of interconnection layers constitutes predetermined circuits constituting the predetermined functional blocks and the pad electrodes 84. Among the interconnection layers constituting the interconnection structure layer 160, the uppermost-level interconnection layer farthest from the semiconductor substrate 150 is a Cu interconnection layer 164.

The pixel substrate 110 and the signal processing substrate 140 are bonded to each other in a face-to-face manner so that the side of the first face 122 of the semiconductor substrate 120 and the side of the first face 152 of the semiconductor substrate 150 face each other. The Cu interconnection layer 134 and the Cu interconnection layer 164 located at the junction between the pixel substrate 110 and the signal processing substrate 140 form a metal bonding (Cu—Cu bonding) between metals constituting these metal interconnections. The metal bonding forms connection portions 112 and 114 (and a connection portion 116 (not illustrated)) that electrically connect the pixel substrate 110 and the signal processing substrate 140. The metal material forming the connection portions 112 and 114 is not limited to Cu (copper), and may be Au (gold), for example.

An optical structure layer 170 including a color filter CF, a planarization layer 172, and a microlens ML is provided on a side of the second face 124 of the semiconductor substrate 120. That is, the configuration example of FIG. 6 is a back side illuminated (BSI) photoelectric conversion device that receives light incident from the side of the back surface (second face 124) opposite to the front surface (first face 122) of the semiconductor substrate 120 on which the photoelectric conversion element PD is disposed. The optical structure layer 170, the pixel substrate 110, and the insulating layer 162 are provided with the pad openings 86 that penetrate them and reach the pad electrodes 84.

In FIG. 7, the pixel substrate 110 includes a semiconductor substrate 120 having a first face 122 and a second face 124, and an interconnection structure layer 130 disposed on a side of the first face 122 of the semiconductor substrate 120. The pixel array unit 10 including the plurality of pixels 12 and the standard signal output circuit 36 are provided on the first face 122 of the semiconductor substrate 120. The interconnection structure layer 130 includes a plurality of interconnection layers disposed in the insulating layer 132. The plurality of interconnection layers constitutes a predetermined circuit constituting the pixel array unit 10 and the standard signal output circuit 36. In addition, the pixel substrate 110 is provided with a through electrode 136 that penetrates the semiconductor substrate 120 and the insulating layer from a side of the second face 124 of the semiconductor substrate 120 and reaches a predetermined interconnection layer of the interconnection structure layer 130. Such an electrode provided through the semiconductor substrate is called a TSV (through silicon via).

The signal processing substrate 140 includes a semiconductor substrate 150 having a first face 152 and a second face 154, and an interconnection structure layer 160 disposed on a side of the first face 152 of the semiconductor substrate 150. In addition to the standard signal output circuit 34, predetermined functional blocks excluding the pixel array unit 10 and the standard signal output circuit 36 are provided on the first face 152 of the semiconductor substrate 150. The interconnection structure layer 160 includes a plurality of interconnection layers disposed in the insulating layer 162. The plurality of interconnection layers constitutes predetermined circuits constituting the predetermined functional blocks and the pad electrodes 84. Among the interconnection layers constituting the interconnection structure layer 160, the uppermost-level interconnection layer farthest from the semiconductor substrate 150 is the interconnection layer 166.

The pixel substrate 110 and the signal processing substrate 140 are bonded in a face-to-back manner so that the side of the second face 124 of the semiconductor substrate 120 and the side of the first face 152 of the semiconductor substrate 150 face each other. The connection portion between the through electrode 136 and the interconnection layer 166 located at the junction between the pixel substrate 110 and the signal processing substrate 140 configures connection portions 112 and 114 (and a connection portion 116 (not illustrated)) electrically connecting the pixel substrate 110 and the signal processing substrate 140.

An optical structure layer 170 including a color filter CF, a planarization layer 172, and a microlens ML is provided on the interconnection structure layer 130 of a side opposite to the semiconductor substrate 120. That is, the configuration example of FIG. 7 is a front side illuminated (FSI) photoelectric conversion device that receives light incident from the side of the front surface (first face 122) of the semiconductor substrate 120 on which the photoelectric conversion element PD is disposed. The optical structure layer 170, the pixel substrate 110, and the insulating layer 162 are provided with the pad openings 86 that penetrate them and reach the pad electrodes 84.

As described above, in the stacked-type image sensor, the image quality and the operation speed may decrease due to a difference in nonlinearity of a circuit corresponding to a characteristic difference between transistors provided in the pixel substrate and transistors provided in the signal processing substrate fabricated by using different process technologies.

In consideration of the correlation with the signal processing circuit, the correction value for correcting the gain error is preferably generated in the signal processing substrate. However, when the gain correction value or the like is calculated only by the column circuit on the signal processing substrate and the standard signal without considering the nonlinearity according to the characteristics of the source follower and the select transistor of the pixel, a deviation from the actual characteristics due to not considering the pixel component becomes a correction error, which becomes a factor of deterioration in image quality.

In addition, various characteristics of the transistor represented by the threshold voltage fluctuate without correlation due to independent manufacturing variations between the pixel substrate and the signal processing substrate. As a result, the interlocking between the voltage level of the clip circuit for limiting the signal amplitude of the pixel output and the reset level of the pixel decreases. As a result, it is necessary to allocate a margin in consideration of the variation amount of each operating point, and the output voltage range of the pixel is compressed.

Further, when a configuration is adopted in which a signal for calculating a correction value for gain error correction is generated only by a circuit on the signal processing substrate, a voltage shift at the time of switching from a pixel output to an output of the signal processing substrate becomes a responsiveness reduction factor, which also hinders speeding up.

In contrast, in the photoelectric conversion device 100 according to the present embodiment, the pixel array unit 10 and the standard signal output unit 40 are disposed on the common pixel substrate 110, and the standard signal output circuit 34 and the reference signal output circuit 48 are disposed on the common signal processing substrate 140. As a result, it is possible to improve the correction value accuracy and linearity by improving the correlation with the pixel characteristics, to improve the gain error correction accuracy, and to minimize the unnecessary operation margin and the voltage shift accompanying the operation point shift based on the device characteristic difference, and to optimize the operation range and increase the speed. Hereinafter, these will be described in more detail while explaining the operation of the photoelectric conversion device 100. Here, for simplification of description, a ramp signal whose signal level monotonically increases or decreases with time is assumed as the reference signal rmp.

The pixel signal output from the pixel 12 in the row selected by the control signal from the vertical scanning circuit 20 is input to the comparator 52 via the signal output line 16. At this time, the slope (time change rate) of the reference signal rmp compared with the pixel signal in the comparator 52 may be controlled in the reference signal output circuit 48. A quantization unit, which is a voltage value per LSB, is determined by the relationship between the slope of the reference signal rmp and the count frequency of the counter circuit 56. Therefore, reducing (making gentler) the slope of the reference signal rmp with fixing the count frequency has the same effect as increasing the gain.

Here, the reference signal rmp is a common signal supplied to the comparator 52 of each column circuit 32 via the reference signal line 50. However, since the comparator 52 is provided for each column circuit 32 as a physically independent circuit, the influence on the characteristics due to manufacturing variations cannot be made completely zero, and a constant relative variation may occur for each column circuit 32. The same applies to the gain characteristics described above. Therefore, the signal acquired by the photoelectric conversion device 100 is output after the gain variation of each column circuit 32 is corrected in the signal processing circuit 80.

The correction value used in the correction processing in the signal processing circuit 80 may be acquired, for example, in a correction value acquisition phase different from the imaging phase for acquiring an image. For example, the correction value may be calculated by acquiring the output of the column circuit 32 based on the standard signal VREF output from the standard signal output circuit 34 in the correction value acquisition phase. The standard signal VREF is preferably adjustable according to the reference signal rmp so that an appropriate amplitude may be set according to the slope of the reference signal rmp, and the correlation with the reference signal rmp is preferably high. Therefore, it is preferable that the standard signal output circuit 34 be provided on the same signal processing substrate 140 as the reference signal output circuit 48 so as to have the same manufacturing variation as that of the reference signal output circuit 48.

On the other hand, it is preferable that the circuit elements of the standard signal output circuit 36, particularly the amplifier transistor M5, have the same transistor size (gate length L, gate width W, etc.) and layout shape as those of the amplifier transistor M3 so as to have the same characteristics as those of the amplifier transistor M3 of the pixel 12. From such a viewpoint, it is preferable that the standard signal output circuit 36 (the standard signal output unit 40) is provided on the same pixel substrate 110 as the pixel array unit 10. By configuring the standard signal output circuit 36 as described above, it is possible to transmit a signal based on the standard signal VREF to the comparator 52 in the subsequent stage via a circuit simulating the input/output characteristics of the pixel source follower represented by gain and linearity. Accordingly, it is possible to acquire the correction value calculation signal having high correlation with the pixel signal in the imaging phase in consideration of the pixel characteristics, and it is possible to acquire a high-quality image signal by improving the correction accuracy of the gain error superimposed on the output signal of the column circuit 32. However, the present disclosure is not limited to this embodiment, and the standard signal output circuit 36 may include an operational amplifier or a voltage follower instead of the amplifier transistor M5. The standard signal output circuit 36 may include an attenuator instead of the amplifier transistor M5. Further, the standard signal output circuit 36 may have a switch configuration for switching whether or not to output the standard signal to the signal output line. In any of these embodiments, the standard signal output circuit 36 is a circuit that outputs a signal based on an input standard signal.

From such a viewpoint, in the photoelectric conversion device 100 according to the present embodiment, the standard signal VREF output from the standard signal output circuit 34 disposed on the signal processing substrate 140 is configured to be supplied to the standard signal output circuit 36 disposed on the pixel substrate 110 via the connection portion 112.

In the CMOS image sensor, in order to reduce offset noise generated in the pixel 12, the standard signal output circuit 36, and the comparator 52, a noise reduction process called CDS (Correlated Double Sampling) is generally performed.

The CDS process is a signal process for reducing noise components commonly included in a signal of a signal level and a signal of a reference level by subtracting the reference level from the signal level. Therefore, the standard signal output circuit 34 is preferably configured to be capable of transiently transiting between two or more potentials including the reference level and the signal level for CDS processing.

However, the standard signal VREF output by the standard signal output circuit 34 does not necessarily need to be one signal capable of transient transition. For example, two or more kinds of DC signals corresponding to the reference level and the signal level for use in the CDS process may be prepared as the standard signal VREF, and the signal input to the amplifier transistor M5 of the standard signal output circuit 36 may be switched according to the operation phase.

Further, in the present embodiment, the gain correction in the signal processing circuit 80 is mainly described, but the present invention is not limited thereto, and for example, data based on the obtained standard signal may be used for linearity correction or the like.

In the present embodiment, the standard signal VREF is assumed to be a signal based on which the gain correction value is calculated, but the application of the standard signal VREF is not limited thereto. For example, the standard signal VREF may be used to limit the voltage operation amplitude of the signal output line 16 to which the pixel signal is output. In this case, the operation of the standard signal output unit 40 is not limited during the correction value acquisition phase, and the control signal SEL_REF is controlled to high-level during the imaging phase to turn on the select transistor M6. In this manner, when the potential of the node FD becomes a potential lower than the standard signal VREF, it can be used as a clipping circuit for clipping the potential of the signal output line 16 to a potential based on the standard signal VREF. At this time, since the amplifier transistor M5 for clipping has a high correlation with the amplifier transistor M3 of the pixel 12 with respect to the influence of the manufacturing variation such as the threshold voltage, it is possible to efficiently design the operation range.

As described above, according to the present embodiment, in the photoelectric conversion device configured by bonding the pixel substrate and the signal processing substrate together, the image quality and the operation speed may be improved.

Although the standard signal VREF is supplied from the standard signal output circuit 34 to the standard signal output unit 40 via one connection portion 114 in the configuration examples of FIG. 4 and FIG. 5, the standard signal VREF may be supplied from the standard signal output circuit 34 to the standard signal output unit 40 via a plurality of connection portions 114. Alternatively, for example, as illustrated in FIG. 8, a plurality of standard signal output circuits 34 may be provided on the signal processing substrate 140, and the standard signals VREF may be supplied from the plurality of standard signal output circuits 34 to the standard signal output unit 40 via the plurality of connection portions 114. With this configuration, the responsiveness of the standard signal VREF is improved, which is advantageous from the viewpoint of speeding up.

Second Embodiment

Figure 9:
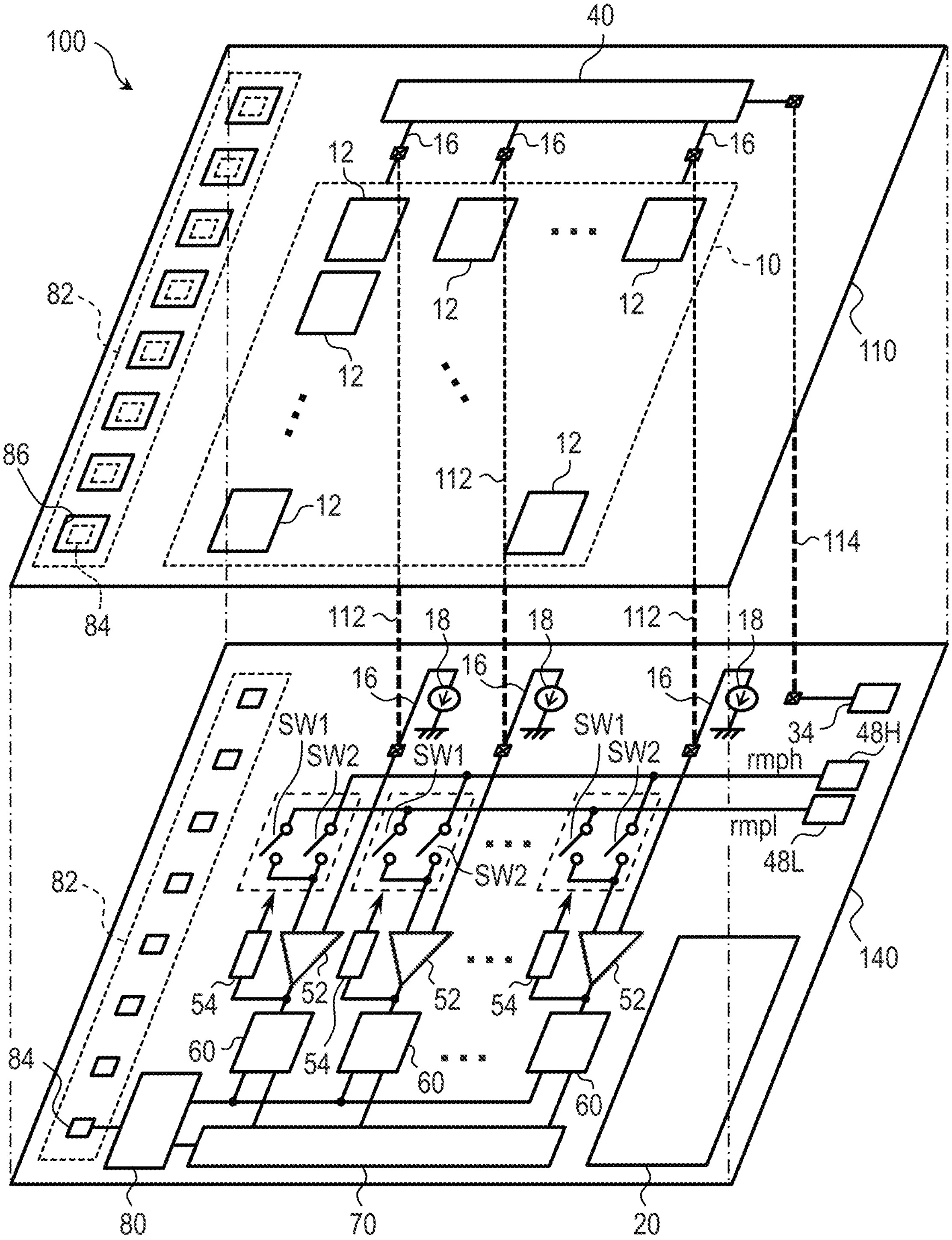
FIG. 9 is a schematic diagram illustrating a configuration example of a photoelectric conversion device according to a second embodiment.
Figure 10:
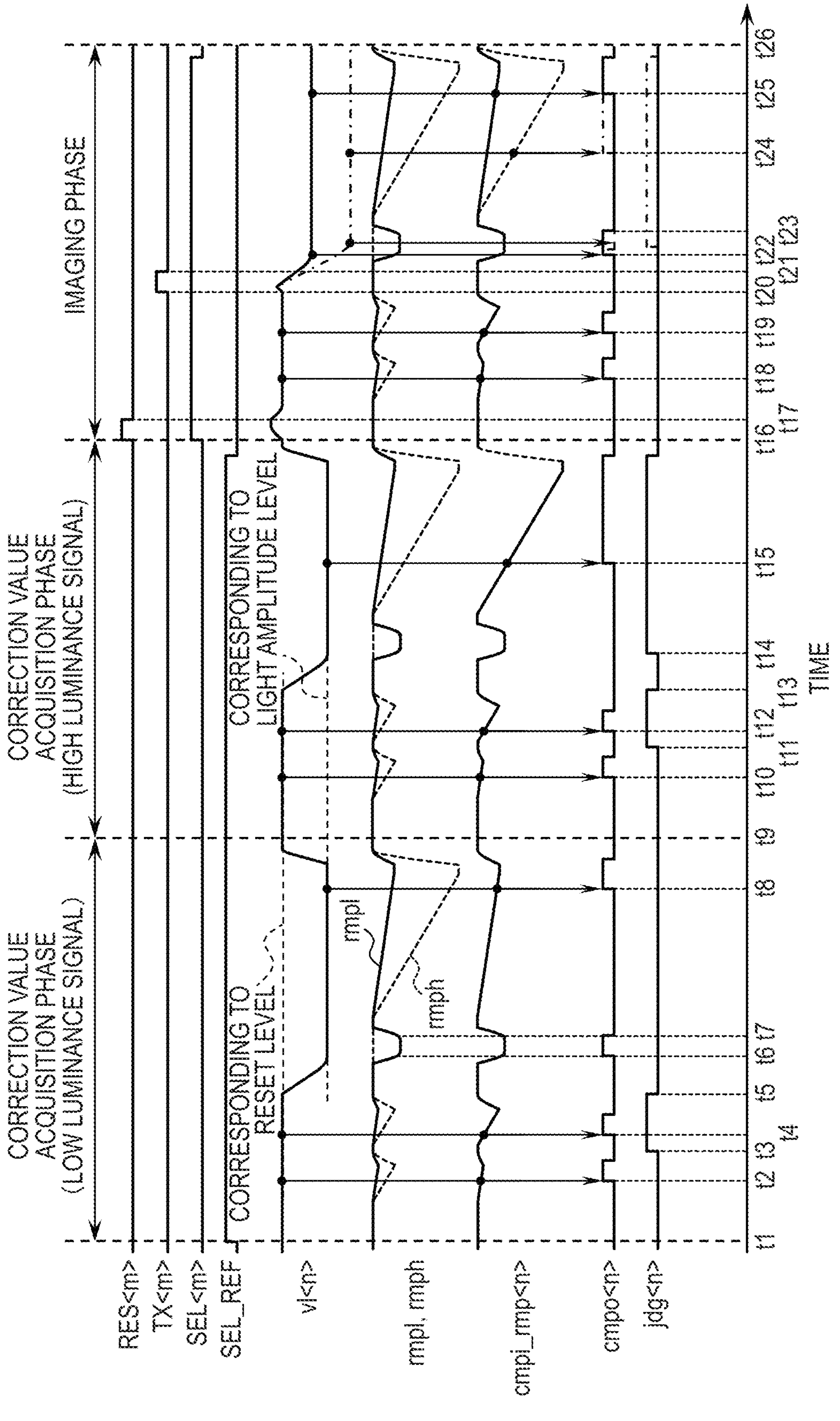
FIG. 10 is a timing chart illustrating a method of driving the photoelectric conversion device according to the second embodiment.

A photoelectric conversion device and a method of driving the same according to a second embodiment of the present invention will be described with reference to FIG. 9 and FIG. 10. The same components as those of the photoelectric conversion device according to the first embodiment are denoted by the same reference numerals, and description thereof will be omitted or simplified. FIG. 9 is a schematic diagram illustrating a configuration example of the photoelectric conversion device according to the present embodiment. FIG. 10 is a timing chart illustrating a method of driving the photoelectric conversion device according to the present embodiment.

The photoelectric conversion device 100 according to the present embodiment is the same as the photoelectric conversion device according to the first embodiment except that the configurations of the reference signal output circuit 48 and the column circuit 32 are different. In the present embodiment, differences from the photoelectric conversion device according to the first embodiment will be mainly described, and description of points similar to those of the photoelectric conversion device according to the first embodiment will be appropriately omitted.

The photoelectric conversion device 100 according to the first embodiment includes one reference signal output circuit 48. On the other hand, as illustrated in FIG. 9, the photoelectric conversion device 100 according to the present embodiment includes a reference signal output circuit 48L and a reference signal output circuit 48H. The reference signal output circuit 48L and the reference signal output circuit 48H are different in the degree of change in the signal level of the reference signal rmp to be output. When a ramp signal is assumed as the reference signal rmp, the slope of a reference signal rmph output from the reference signal output circuit 48H is larger (steeper) than the slope of a reference signal rmpl output from the reference signal output circuit 48L. Here, the reference signal rmpl is a reference signal used for a low-luminance pixel signal, and since the slope is small, AD conversion with a high gain is possible. The reference signal rmph is a reference signal used for a high-luminance pixel signal, and since the slope is large, AD conversion with a low gain is possible.

The column circuit 32 of each column of the photoelectric conversion device 100 according to the present embodiment further includes switches SW1 and SW2 and a determination unit 54 in addition to the standard signal output circuit 36, the comparator 52, and the memory 60. The switches SW1 and SW2 function as a reference signal selection circuit. The switch SW1 is connected between the reference signal output circuit 48L and the comparator 52. The switch SW2 is connected between the reference signal output circuit 48H and the comparator 52. The determination unit 54 is connected to the output node of the comparator 52 and has a function of controlling one of the switches SW1 and SW2 to be ON and the other to be OFF in accordance with the output signal of the comparator 52 and the control by the timing generation unit 90. Here, when a determination signal jdg output from the determination unit 54 is at low-level, the switch SW1 is turned on, the switch SW2 is turned off, and the reference signal rmpl is selected. When the determination signal jdg output from the determination unit 54 is at high-level, the switch SW1 is turned off, the switch SW2 is turned on, and the reference signal rmph is selected. The determination signal jdg output from the determination unit 54 may be forcibly set by the timing generation unit 90 or the like. By switching the slope of the reference signal rmp in accordance with the magnitude of the amplitude of the light signal output from the pixel 12, it is possible to achieve high-speed AD conversion and a high dynamic range.

Next, a method of driving the photoelectric conversion device according to the present embodiment will be described with reference to FIG. 10. FIG. 10 illustrates waveforms of the control signals RES, TX, SEL, and SEL_REF, the voltage v1 of the signal output line 16, the reference signals rmpl and rmph, a reference signal cmpi_rmp input to the comparator 52, an output signal cmpo of the comparator 52, and the determination signal jdg. Here, <m> attached to the signs of the control signals RES, TX, and SEL represents a row number, and <n> attached to the signs of the voltage v1, the reference signal cmpi_rmp, the output signal cmpo, and the determination signal jdg represents a column number. FIG. 10 illustrates an operation of reading out signals from the pixel 12 arranged in the m-th row and the n-th column of the pixel array unit 10.

The operation illustrated in FIG. 10 is roughly divided into a correction value acquisition phase and an imaging phase. In the correction value acquisition phase, gain information based on the reference signal rmpl and gain information based on the reference signal rmph are acquired based on the standard signal VREF. In the imaging phase, processing is performed on the output signal from the pixel 12 based on the acquired gain information.

A period from time t1 to time t9 is a correction value acquisition phase for acquiring gain information based on the reference signal rmpl for the low luminance signal. Just before time t1, it is assumed that the control signals RES<m>, TX<m>, SEL<m>, SEL_REF, and the determination signal jdg are at low-level.

At the time t1, the timing generation unit 90 controls the control signal SEL_REF from low-level to high-level. Accordingly, the select transistor M6 of the standard signal output circuit 36 of each column is turned on, and the signal (voltage v1) generated by the amplifier transistor M5 based on the standard signal VREF is output to the signal output line 16 via the select transistor M6.

In the correction value acquisition phase of the low luminance signal, the standard signal VREF is controlled to a level corresponding to the reset level and a level corresponding to the light amplitude. At the time t1, the standard signal VREF is at a level corresponding to the reset level. The level corresponding to the light amplitude is preferably set to a switching level between the reference signal rmpl and the reference signal rmph (hereinafter, referred to as a "luminance switching level"). A signal (reference signal cmpi_rmp) selected by the reference signal selection circuit (switches SW1 and SW2) according to the determination signal jdg among the reference signal rmpl and the reference signal rmph is input to the comparator 52.

After the voltage v1 of the signal output line 16 is settled to a potential corresponding to the reset level, the comparator 52 performs a comparison operation between the level of the voltage v1 and the reference signal cmpi_rmp in a state where the reference signal rmpl is selected in accordance with the determination signal jdg at low-level. As a result, it is assumed that the output signal cmpo of the comparator 52 is inverted (transitioned to high-level) at time t2. The memory 60 holds a count value at a timing when the output signal cmpo is inverted. The count value at this time is assumed to be NREF_L1.

At the subsequent time t3, the timing generation unit 90 forcibly controls the determination signal jdg output from the determination unit 54 to high-level. The comparator 52 performs a comparison operation between the level of the voltage v1 and the reference signal cmpi_rmp in a state where the reference signal rmph is selected in accordance with the determination signal jdg at high-level. As a result, it is assumed that the output signal cmpo of the comparator 52 is inverted (transitioned to high-level) at time t4. The memory 60 holds a count value at a timing when the output signal cmpo is inverted. The count value at this time is referred to as NREF_H1.

At the subsequent time t5, the timing generation unit 90 cancels the forced control of the determination signal jdg output from the determination unit 54 to high-level, and returns the determination signal jdg to low-level. The standard signal output circuit 34 switches the standard signal VREF from a level corresponding to the reset level to a level corresponding to the light amplitude.

In a period from time t6 to time t7 after the voltage v1 of the signal output line 16 transitions to the level corresponding to the light amplitude, the reference signal output circuit 48L outputs a signal of a constant level corresponding to the luminance switching level as the reference signal rmpl. The reference signal selection circuit (switches SW1 and SW2) selects the reference signal rmpl at the constant level in accordance with the low-level determination signal jdg. The comparator 52 compares the level of the voltage v1 with the reference signal cmpi_rmp at the constant level. In the correction value acquisition phase, since the determination here is ignored, it is not necessary to perform the above-described operation with the reference signal rmp, but from the viewpoint of the responsiveness of the reference signal rmp, it is preferable to make the transient operation the same as the imaging phase.

Thereafter, the reference signal output circuit 48L releases the constant level of the reference signal rmpl, and starts to change the signal level of the reference signal rmpl with time from the reference voltage. The comparator 52 performs a comparison operation between the voltage v1 corresponding to the light amplitude level and the reference signal cmpi_rmp in a state where the reference signal rmpl is selected in accordance with the determination signal jdg at low-level. At time t8, when the output signal cmpo of the comparator 52 is inverted (transition to high-level), the memory 60 holds the count value at a timing when the output signal cmpo is inverted. The count value at this time is referred to as SREF_L.

The signal processing circuit 80 in the subsequent stage may acquire a signal value for calculating the gain correction value of the low luminance signal by taking the difference between the count value SREF_L and the count value NREF_L1 (hereinafter, referred to as the count value REF_L).

The subsequent period from time t9 to time t16 is a correction value acquisition phase for acquiring gain information based on the reference signal rmph for the high luminance signal. At the time t9, the control signals RES<m>, TX<m>, SEL<m>, and the determination signal jdg are at low-level, and the control signal SEL_REF is at high-level.

Also in the correction value acquisition phase of the high luminance signal, the standard signal VREF is controlled to a level corresponding to the reset level and a level corresponding to the light amplitude. At the time t9, the standard signal VREF is at a level corresponding to the reset level. In addition, the control signal SEL_REF is at high-level, and a voltage corresponding to the reset level and a voltage corresponding to the light amplitude level are output to the signal output line 16 based on the standard signal VREF in the same manner as in the period from the time t1 to the time t8. A signal (reference signal cmpi_rmp) selected by the reference signal selection circuit (switches SW1 and SW2) according to the determination signal jdg among the reference signal rmpl and the reference signal rmph is input to the comparator 52.

After the voltage v1 of the signal output line 16 is settled to a potential corresponding to the reset level, the comparator 52 performs a comparison operation between the level of the voltage v1 and the reference signal cmpi_rmp in a state where the reference signal rmpl is selected in accordance with the determination signal jdg at low-level. As a result, at time t10, the output signal cmpo of the comparator 52 is inverted (transitioned to high-level).

At the subsequent time t11, the timing generation unit 90 forcibly controls the determination signal jdg output from the determination unit 54 to high-level. As a result, the reference signal rmph is selected as the reference signal cmpi_rmp.

Next, the comparator 52 performs a comparison operation between the level of the voltage v1 and the reference signal cmpi_rmp in a state where the reference signal rmph is selected in accordance with the determination signal jdg at high-level. As a result, it is assumed that the output signal cmpo of the comparator 52 is inverted (transitioned to high-level) at time t12. The memory 60 holds a count value at a timing when the output signal cmpo is inverted. The count value at this time is referred to as NREF_H2.

At the subsequent time t13, the timing generation unit 90 cancels the forced control of the determination signal jdg output from the determination unit 54 to high-level and returns the determination signal jdg to low-level. The standard signal output circuit 34 switches the standard signal VREF from a level corresponding to the reset level to a level corresponding to the light amplitude.

At time t14 after the voltage v1 of the signal output line 16 transitions to the level corresponding to the light amplitude, the timing generation unit 90 forcibly controls the determination signal jdg output from the determination unit 54 to high-level. As a result, the reference signal rmph is selected as the reference signal cmpi_rmp.

Next, the comparator 52 performs a comparison operation between the voltage v1 corresponding to the light amplitude level and the reference signal cmpi_rmp in a state where the reference signal rmph is selected. At time t15, when the output signal cmpo of the comparator 52 is inverted (transition to high-level), the memory 60 holds the count value at a timing when the output signal cmpo is inverted. The count value at this time is referred to as SREF_H.

The signal processing circuit 80 in the subsequent stage may acquire the signal value for calculating the gain correction value of the high luminance signal by taking the difference between the count value SREF_H and the count value NREF_H2 (hereinafter, referred to as the count value REF_H).

By calculating the ratio (REF_L/REF_H) of the count values REF_L and REF_H acquired in this manner, the ratio of the slopes of the reference signals rmpl and rmph including the influence of manufacturing variations, temperature, power supply voltage, pixel characteristics, and the like may be acquired with high accuracy. In an imaging phase to be described later, when a low-gain high-luminance signal is combined in the same quantization unit as that of a high-gain low-luminance signal, gain correction is performed using the ratio (REF_L/REF_H). As a result, it is possible to obtain good signal characteristics with high linearity and small variation at the luminance switching level.

The subsequent period from time t16 to time t26 is the imaging phase. Just before the time t16, the control signals RES<m>, TX<m>, SEL<m>, and the determination signal jdg are at low-level. In addition, the control signal SEL_REF is controlled to low-level by the timing generation unit 90 after the end of the correction value acquisition phase.

At the time t16, the vertical scanning circuit 20 controls the control signal SEL<m> of the m-th row to be read out to high-level. As a result, the select transistors M4 of the pixels 12 belonging to the row are turned on, and a signal corresponding to the potential of the node FD of the corresponding pixel 12 may be output to the signal output line 16 of each column.

In a period from the time t16 to time t17, the vertical scanning circuit 20 controls the control signal RES<m> of the row to be read out to high-level. As a result, the reset transistor M2 of the pixel 12 belonging to the row is turned on, and the node FD becomes a reset potential corresponding to the voltage VDD. The voltage v1 of the signal output line 16 becomes a potential corresponding to the reset potential of the node FD. After the control signal RES<m> transitions to low-level at the time t17, the voltage v1 of the signal output line 16 that has been settled is at the pixel reset level.

Next, the comparator 52 performs a comparison operation between the voltage v1 (pixel reset level) and the reference signal cmpi_rmp in a state where the reference signal rmpl is selected. At time t18, when the output signal cmpo of the comparator 52 is inverted (transition to high-level), the memory 60 holds the count value at a timing when the output signal cmpo is inverted. The count value at this time is referred to as N_L.

Next, the comparator 52 performs a comparison operation between the voltage v1 (pixel reset level) and the reference signal cmpi_rmp in a state where the reference signal rmph is selected. At time t19, when the output signal cmpo of the comparator 52 is inverted (transition to high-level), the memory 60 holds the count value at a timing when the output signal cmpo is inverted. The count value at this time is referred to as N_H.

In the subsequent period from time t20 to time t21, the vertical scanning circuit 20 controls the control signal TX<m> of the m-th row to be read out to high-level. Accordingly, the transfer transistors M1 of the pixels 12 belonging to the row are turned on, and the charge accumulated in the photoelectric conversion element PD is transferred to the node FD. The voltage v1 of the signal output line 16 has a potential corresponding to the amount of charge transferred to the node FD. After the control signal TX<m> transitions to low-level at time t21, the voltage v1 of the signal output line 16 that has been settled is at the light amplitude level.

After the voltage v1 of the signal output line 16 is settled, in a period from time t22 to time t23, the reference signal output circuit 48L outputs a signal of a constant level corresponding to the luminance switching level as the reference signal rmpl. The reference signal selection circuit (switches SW1 and SW2) selects the reference signal rmpl, and the comparator 52 compares the voltage v1 of the signal output line 16 with the reference signal rmpl.

When the output signal cmpo is not inverted by the comparison operation, that is, when it is determined that the luminance is high, the determination signal jdg becomes high-level as indicated by a one-dot chain line and the reference signal rmph is selected. Thereafter, the reference signal output circuit 48H starts to change the signal level of the reference signal rmph with time from the reference voltage. The comparator 52 performs a comparison operation between the voltage v1 corresponding to the light amplitude level and the reference signal cmpi_rmp in a state where the reference signal rmph is selected in accordance with the determination signal jdg at high-level. At time t24, when the output signal cmpo of the comparator 52 is inverted (transition to high-level), the memory 60 holds the count value at a timing when the output signal cmpo is inverted. The count value at this time is referred to as S_H.

When the output signal cmpo is inverted by the comparison operation, that is, when it is determined that the luminance is low, the determination signal jdg becomes low-level as indicated by a solid line, and the reference signal rmpl is selected. Thereafter, the reference signal output circuit 48L releases the fixed level of the reference signal rmpl and starts to change the signal level of the reference signal rmpl with time from the reference voltage. The comparator 52 performs a comparison operation between the voltage v1 corresponding to the light amplitude level and the reference signal cmpi_rmp in a state where the reference signal rmpl is selected in accordance with the determination signal jdg at low-level. At time t25, when the output signal cmpo of the comparator 52 is inverted (transition to high-level), the memory 60 holds the count value at a timing when the output signal cmpo is inverted. The count value at this time is referred to as S_L.

The level of the output signal cmpo in the period from the time t22 to the time t23 is held in the memory 60 as information indicating whether the light amplitude count value acquired in the imaging phase is low luminance or high luminance and is transferred to the signal processing circuit 80 together with each acquired count value. When it is determined that the light amplitude level is low, the signal processing circuit 80 sets a difference value between the count value S_L and the count value N_L as the pixel data. When the light amplitude level is determined to be high luminance, the signal processing circuit 80 sets, as pixel data, a value obtained by integrating the difference value between the count value S_H and the count value N_H with the ratio (REF_L/REF_H) as a coefficient. This makes it possible to perform high-accuracy gain correction processing including pixel characteristics.

In the present embodiment, a method of acquiring a count value based on a reset level for each of the reference signals rmpl and rmph has been described, but the present invention is not limited thereto. For example, the count value based on the reset level may be subjected to signal processing using only the value based on the reference signal rmpl, and the count value corresponding to the reset level based on the reference signal ramph may be obtained at a timing different from the timing of the signal processing of the pixel in the imaging phase.

As described above, according to the present embodiment, in the photoelectric conversion device configured by bonding the pixel substrate and the signal processing substrate together, the image quality and the operation speed may be improved.

Third Embodiment

Figure 11:
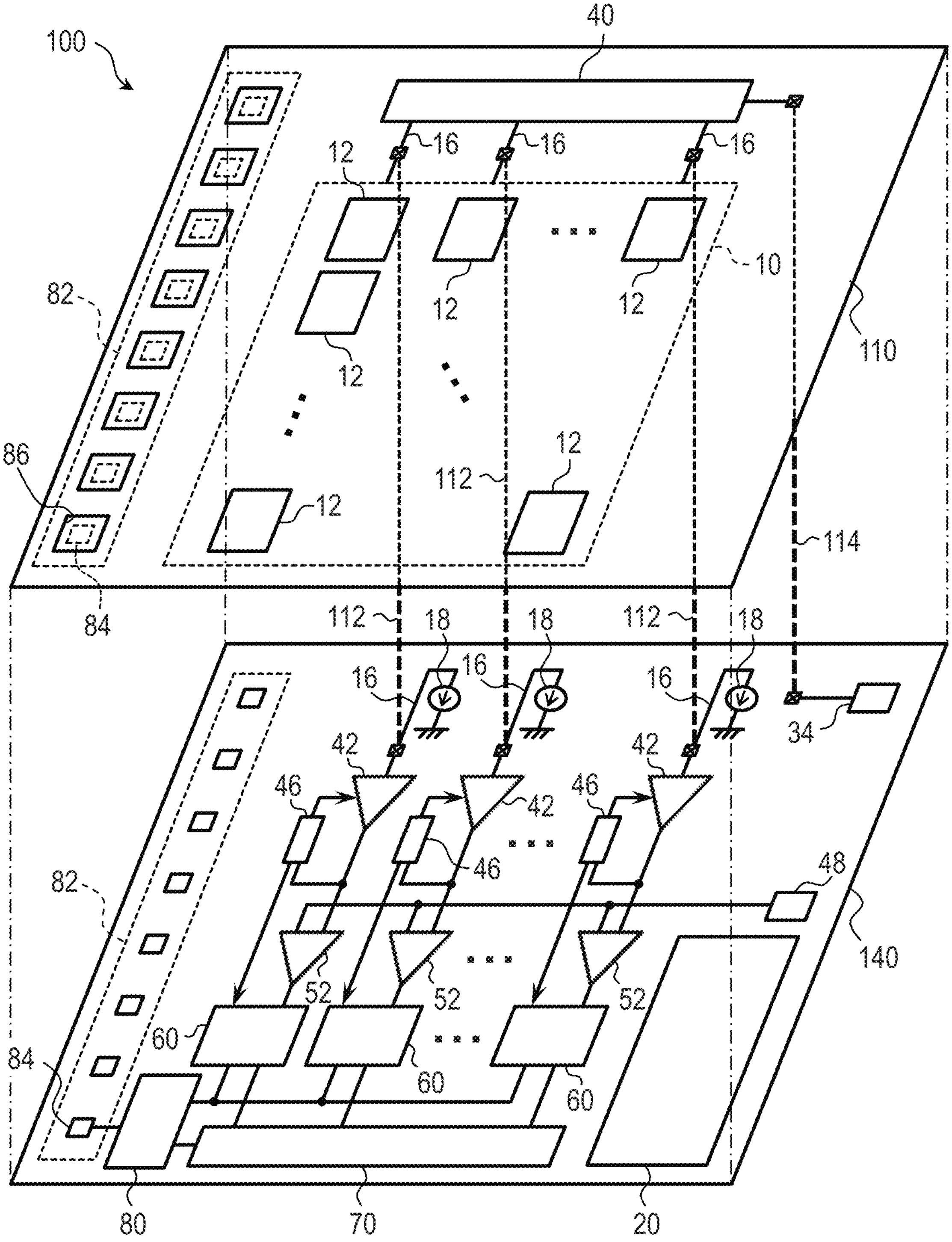
FIG. 11 is a schematic diagram illustrating a configuration example of a photoelectric conversion device according to a third embodiment.
Figure 12:
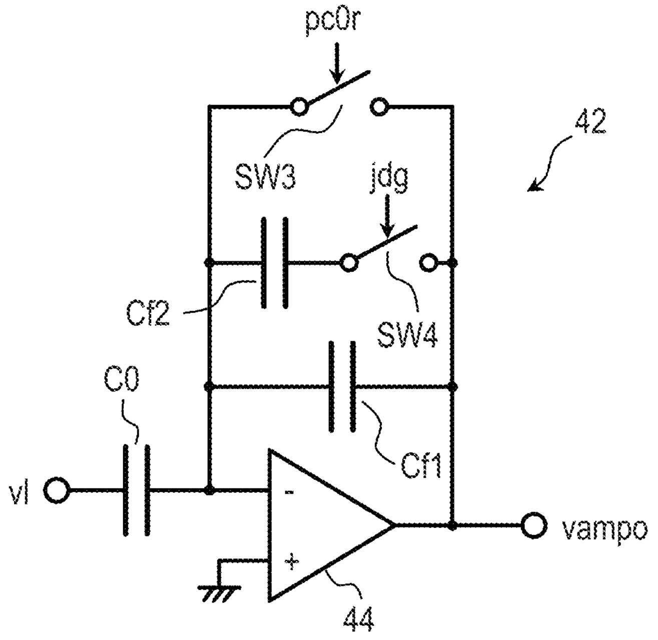
FIG. 12 is a circuit diagram illustrating a configuration example of a column amplifier of a photoelectric conversion device according to the third embodiment.
Figure 13:
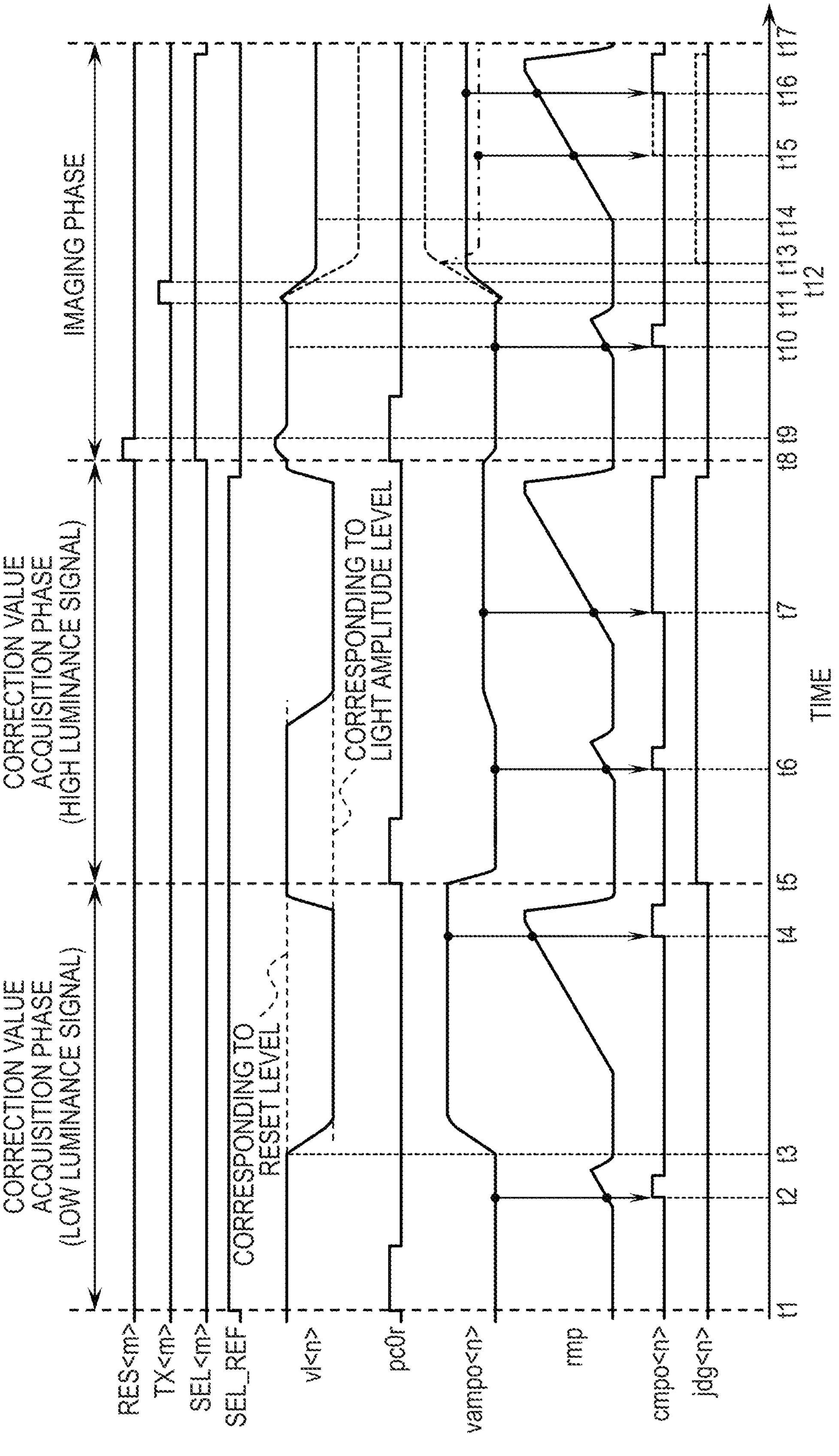
FIG. 13 is a timing chart illustrating a method of driving the photoelectric conversion device according to the third embodiment.

A photoelectric conversion device and a method of driving the same according to a third embodiment of the present invention will be described with reference to FIG. 11 to FIG. 13. The same components as those of the photoelectric conversion device according to the first or second embodiment are denoted by the same reference numerals, and description thereof will be omitted or simplified. FIG. 11 is a schematic diagram illustrating a configuration example of the photoelectric conversion device according to the present embodiment. FIG. 12 is a circuit diagram illustrating a configuration example of a column amplifier of the photoelectric conversion device according to the present embodiment. FIG. 13 is a timing chart illustrating a method of driving the photoelectric conversion device according to the present embodiment.

The photoelectric conversion device 100 according to the present embodiment is the same as the photoelectric conversion device according to the first embodiment except that the configuration of the column circuit 32 is different. In the present embodiment, differences from the photoelectric conversion device according to the first embodiment will be mainly described, and description of points similar to those of the photoelectric conversion device according to the first embodiment will be appropriately omitted.

As illustrated in FIG. 11, the column circuit 32 of each column of the photoelectric conversion device 100 according to the present embodiment further includes a column amplifier 42 and a determination unit 46 in addition to the standard signal output circuit 36, the comparator 52, and the memory 60. As illustrated in, e.g., FIG. 12, the column amplifier 42 may include an operational amplifier 44, an input capacitor C0, feedback capacitors Cf1 and Cf2, and switches SW3 and SW4.

The signal output line 16 is connected to one terminal of the input capacitor C0 which is also an input node of the column amplifier 42. The other terminal of the input capacitor C0 is connected to one terminal of the switch SW3, one terminal of the feedback capacitor Cf1, one terminal of the feedback capacitor Cf2, and an inverting input node (−) of the operational amplifier 44. The non-inverting input node (+) of the operational amplifier 44 is connected to the ground voltage node. The other terminal of the feedback capacitor Cf2 is connected to one terminal of the switch SW4. The other terminal of the switch SW3, the other terminal of the switch SW4, and the other terminal of the feedback capacitor Cf1 are connected to the output node of the operational amplifier 44, which is also the output node of the column amplifier 42. An output node of the column amplifier 42 is connected to a first input node of the comparator 52 and an input node of the determination unit 46. An output node of the determination unit 46 is connected to the column amplifier 42 and the memory 60.

The switch SW3 is a reset switch of the column amplifier 42 and is controlled by a control signal pc0*r* from the timing generation unit 90. That is, when the switch SW3 is turned on, the inverting input node and the output node of the operational amplifier 44 are connected to form a voltage follower, and the output voltage of the operational amplifier 44 is reset to the reference voltage. The switch SW4 is controlled by a determination signal jdg output from the determination unit 46. The determination unit 46 is connected to an output node of the comparator 52 and is configured to output a determination signal jdg according to an output signal of the comparator 52 or control by the timing generation unit 90. For example, when the output voltage vampo of the column amplifier 42 is equal to or higher than a predetermined voltage value (hereinafter, referred to as a luminance switching level), the determination unit 46 determines that the luminance is high, and outputs a high-level determination signal jdg. When the output voltage vampo of the column amplifier 42 is less than the luminance switching level, the determination unit 46 determines that the luminance is low, and outputs a low-level determination signal jdg. The determination signal jdg output from the determination unit 46 may be forcibly set by the timing generation unit 90 or the like.

The gain of the column amplifier 42 is determined by the ratio of the input capacitor C0 to the feedback capacitances Cf1 and Cf2. That is, the gain of the column amplifier when the switch SW4 is on is (C1/(Cf1+Cf2)) when the capacitance values of the input capacitor C0 and the feedback capacitances Cf1 and Cf2 are represented by the same sign. The gain of the column amplifier when the switch SW4 is off is (C0/Cf1). Since the value of (C0/Cf1) is larger than the value of (C0/(Cf1+Cf2)), the column amplifier 42 is set to a high gain in the low luminance determination and is set to a low gain in the high luminance determination. The column amplifier 42 outputs the output voltage vampo obtained by amplifying the voltage v1 of the signal output line 16 with the gain set in this manner to the comparator 52.

Next, a method of driving the photoelectric conversion device according to the present embodiment will be described with reference to FIG. 13. FIG. 13 illustrates waveforms of the control signals RES, TX, SEL, SEL_REF, and pc0*r*, the voltage v1 of the signal output line 16, the output voltage vampo of the column amplifier 42, the reference signal rmp, the output signal cmpo of the comparator 52, and the determination signal jdg. Here, <m> attached to the reference numerals of the control signals RES, TX, and SEL represents a row number, and <n> attached to the reference numerals of the voltage v1, the output voltage vampo, the output signal cmpo, and the determination signal jdg represents a column number. FIG. 13 illustrates an operation of reading out signals from the pixel 12 arranged in the m-th row and the n-th column of the pixel array unit 10. The description of the same parts as those of the second embodiment, such as the standard signal VREF, the operation of the pixel 12, and the inverting operation of the comparator 52, and the like is omitted as appropriate.

A period from time t1 to time t5 is a correction value acquisition phase for acquiring a signal value for calculating a gain correction value of the low luminance signal. Just before the time t1, it is assumed that the control signals RES<m>, TX<m>, SEL<m>, SEL_REF, pc0*r*, and the determination signal jdg are at low-level. The times t1 to t17 in FIG. 13 and the times t1 to t26 in FIG. 10 are independent of each other, and do not indicate operations related to each other even at the same time.

At the time t1, the timing generation unit 90 controls the control signal pc0*r* from low-level to high-level. Thus, the column amplifier 42 of the column circuit 32 of each column is reset. Thereafter, the timing generation unit 90 returns the control signal pc0*r* from high-level to low-level and cancels the reset of the column amplifier 42. At this time, the control signal SEL_REF is at high-level, the standard signal VREF is at a level corresponding to the reset level, and the voltage v1 corresponding to the reset level is output to the signal output line 16. At this time, the determination signal jdg is set to low-level, and the column amplifier 42 is set to a high gain (C0/Cf1).

Next, the comparator 52 performs a comparison operation between the output voltage vampo of the column amplifier 42 and the reference signal rmp with the voltage v1 of the reset level as an input. As a result of the comparison operation, it is assumed that the level of the reference signal rmp exceeds the level of the output voltage vampo at time t2, and the output signal cmpo of the comparator 52 is inverted (transitioned to high-level). The memory 60 holds a count value at a timing when the output signal cmpo is inverted. The count value at this time is referred to as NREF_L.

At the subsequent time t3, the standard signal output circuit 34 switches the standard signal VREF from the level corresponding to the reset level to the level corresponding to the light amplitude. After the voltage v1 of the signal output line 16 transitions to the level corresponding to the light amplitude, the comparator 52 compares the output voltage vampo of the column amplifier 42 to which the voltage v1 of the light amplitude level is input with the reference signal rmp. As a result of the comparison operation, it is assumed that the level of the reference signal rmp exceeds the level of the output voltage vampo at time t4, and the output signal cmpo of the comparator 52 is inverted (transitioned to high-level). The memory 60 holds a count value at a timing when the output signal cmpo is inverted. The count value at this time is referred to as SREF_L.

The signal processing circuit 80 in the subsequent stage may acquire a signal value for calculating a gain correction value of the low luminance signal by taking a difference between the count value SREF_L and the count value NREF_L (hereinafter, referred to as a count value REF_L).

A period from time t5 to time t8 is a correction value acquisition phase for acquiring a signal value for calculating a gain correction value of the high luminance signal. At the time t5, the control signals RES<m>, TX<m>, and SEL<m> are at low-level, and the control signal SEL_REF is at high-level. The determination signal jdg is controlled from low-level to high-level at the time t5.

At the time t5, the timing generation unit 90 controls the control signal pc0*r* from low-level to high-level. Thus, the column amplifier 42 of the column circuit 32 of each column is reset. Thereafter, the timing generation unit 90 returns the control signal pc0*r* from high-level to low-level and cancels the reset of the column amplifier 42. At this time, the control signal SEL_REF is at high-level, the standard signal VREF is at a level corresponding to the reset level, and the voltage v1 corresponding to the reset level is output to the signal output line 16. At this time, the determination signal jdg is set to high-level, and the column amplifier 42 is set to a low gain (C0/(Cf1+Cf2)).

Next, the comparator 52 performs a comparison operation between the output voltage vampo of the column amplifier 42 and the reference signal rmp with the voltage v1 of the reset level as an input. As a result of the comparison operation, it is assumed that the level of the reference signal rmp exceeds the level of the output voltage vampo at time t6, and the output signal cmpo of the comparator 52 is inverted (transitioned to high-level). The memory 60 holds a count value at a timing when the output signal cmpo is inverted. The count value at this time is referred to as NREF_H.

Next, the standard signal output circuit 34 switches the standard signal VREF from the level corresponding to the reset level to the level corresponding to the light amplitude. After the voltage v1 of the signal output line 16 transitions to the level corresponding to the light amplitude, the comparator 52 compares the output voltage vampo of the column amplifier 42 to which the voltage v1 of the light amplitude level is input with the reference signal rmp. As a result of the comparison operation, it is assumed that the level of the reference signal rmp exceeds the level of the output voltage vampo at time t7, and the output signal cmpo of the comparator 52 is inverted (transitioned to high-level). The memory 60 holds a count value at a timing when the output signal cmpo is inverted. The count value at this time is referred to as SREF_H.

The signal processing circuit 80 in the subsequent stage may acquire a signal value for calculating a gain correction value of the high luminance signal by taking a difference between the count value SREF_H and the count value NREF_H (hereinafter, referred to as a count value REF_H).

By calculating the ratio (REF_L/REF_H) of the count values REF_L and REF_H acquired in this manner, it is possible to acquire the gain ratio of the column amplifier 42 including the influence of manufacturing variation, temperature, power supply voltage, pixel characteristics, and the like with high accuracy. In an imaging phase to be described later, when a low-gain high-luminance signal is combined with the same charge conversion coefficient as that of a high-gain low-luminance signal, gain correction is performed using the ratio (REF_L/REF_H). As a result, it is possible to obtain good signal characteristics with high linearity and small variation at the luminance switching level.

The subsequent period from time t8 to time t17 is the imaging phase. Just before the time t8, the control signals RES<m>, TX<m>, SEL<m>, and the determination signal jdg are at low-level. In addition, the control signal SEL_REF is controlled to low-level by the timing generation unit 90 after the end of the correction value acquisition phase.

At the time t8, the vertical scanning circuit 20 controls the control signal RES<m> of the m-th row to be read out to high-level. As a result, the reset transistors M2 of the pixels 12 belonging to the row are turned on, and the node FD becomes a reset potential corresponding to the voltage VDD. The voltage v1 of the signal output line 16 becomes a potential corresponding to the reset potential of the node FD. After the control signal RES<m> transitions to low-level, the voltage v1 of the signal output line 16 that has been settled is at the pixel reset level.

At the time t8, the timing generation unit 90 controls the control signal pc0*r* from low-level to high-level. Thus, the column amplifier 42 of the column circuit 32 of each column is reset. Thereafter, the timing generation unit 90 returns the control signal pc0*r* from high-level to low-level and cancels the reset of the column amplifier 42. At this time, the determination signal jdg is set to low-level, and the column amplifier 42 is set to a high gain (C0/Cf1).

After the control signals RES<m> and pc0*r* transition to low-level, the comparator 52 performs a comparison operation between the output voltage vampo of the column amplifier 42 to which the voltage v1 of the pixel reset level is input and the reference signal rmp. As a result of the comparison operation, it is assumed that the level of the reference signal rmp exceeds the level of the output voltage vampo at time t10, and the output signal cmpo of the comparator 52 is inverted (transitioned to high-level). The memory 60 holds a count value at a timing when the output signal cmpo is inverted. The count value at this time is referred to as N_L.

In a subsequent period from time t11 to time t12, the vertical scanning circuit 20 controls the control signal TX<m> of the m-th row to be read out to high-level. Accordingly, the transfer transistors M1 of the pixels 12 belonging to the row is turned on, and the charge accumulated in the photoelectric conversion element PD is transferred to the node FD. The voltage v1 of the signal output line 16 has a potential corresponding to the amount of charge transferred to the node FD. After the control signal TX<m> transitions to low-level at time t12, the voltage v1 of the signal output line 16 that has been settled is at the light amplitude level.

In the subsequent period from time t13 to time t14, the comparator 52 performs a comparison operation between the output voltage vampo of the column amplifier 42 to which the voltage v1 of the light amplitude level is input and the luminance switching level. As a result of the comparison operation, when it is determined that the level of the output voltage vampo is lower than the luminance switching level (low luminance determination), the determination signal jdg is set to low-level (solid line in FIG. 13). As a result of the comparison operation, when it is determined that the level of the output voltage vampo is higher than the luminance switching level (high luminance determination), the determination signal jdg is set to high-level (a broken line in FIG. 13). When the determination signal jdg transitions from low-level to high-level, the column amplifier 42 switches to the setting of the low gain (C0/(Cf1+Cf2)), and the level of the output voltage vampo decreases (a one-dot chain line in FIG. 13).

Next, the comparator 52 performs a comparison operation between the output voltage vampo of the column amplifier 42 and the reference signal rmp with the voltage v1 of the light amplitude level as an input.

In the high luminance determination, it is assumed that, as a result of the comparison operation, the level of the reference signal rmp exceeds the level of the output voltage vampo at time t15, and the output signal cmpo of the comparator 52 is inverted (transitioned to high-level). The memory 60 holds a count value at a timing when the output signal cmpo is inverted. The count value at this time is referred to as S_H.

In the low luminance determination, it is assumed that, as a result of the comparison operation, the level of the reference signal rmp exceeds the level of the output voltage vampo at time t16, and the output signal cmpo of the comparator 52 is inverted (transitioned to high-level). The memory 60 holds a count value at a timing when the output signal cmpo is inverted. The count value at this time is referred to as S_L.

The determination result in the period from the time t13 to the time t14 is held in the memory 60 as information indicating whether the light amplitude count value acquired in the imaging phase is low luminance or high luminance and is transferred to the signal processing circuit 80 together with each acquired count value. When it is determined that the light amplitude level is low, the signal processing circuit 80 sets a difference value between the count value S_L and the count value N_L as the pixel data. When the light amplitude level is determined to be high luminance, the signal processing circuit 80 sets, as pixel data, a value obtained by integrating the difference value between the count value S_H and the count value N_L with the ratio (REF_L/REF_H) as a coefficient. This makes it possible to perform high-accuracy gain correction processing including pixel characteristics.

As described above, according to the present embodiment, in the photoelectric conversion device configured by bonding the pixel substrate and the signal processing substrate together, the image quality and the operation speed may be improved.

Fourth Embodiment

Figure 14:
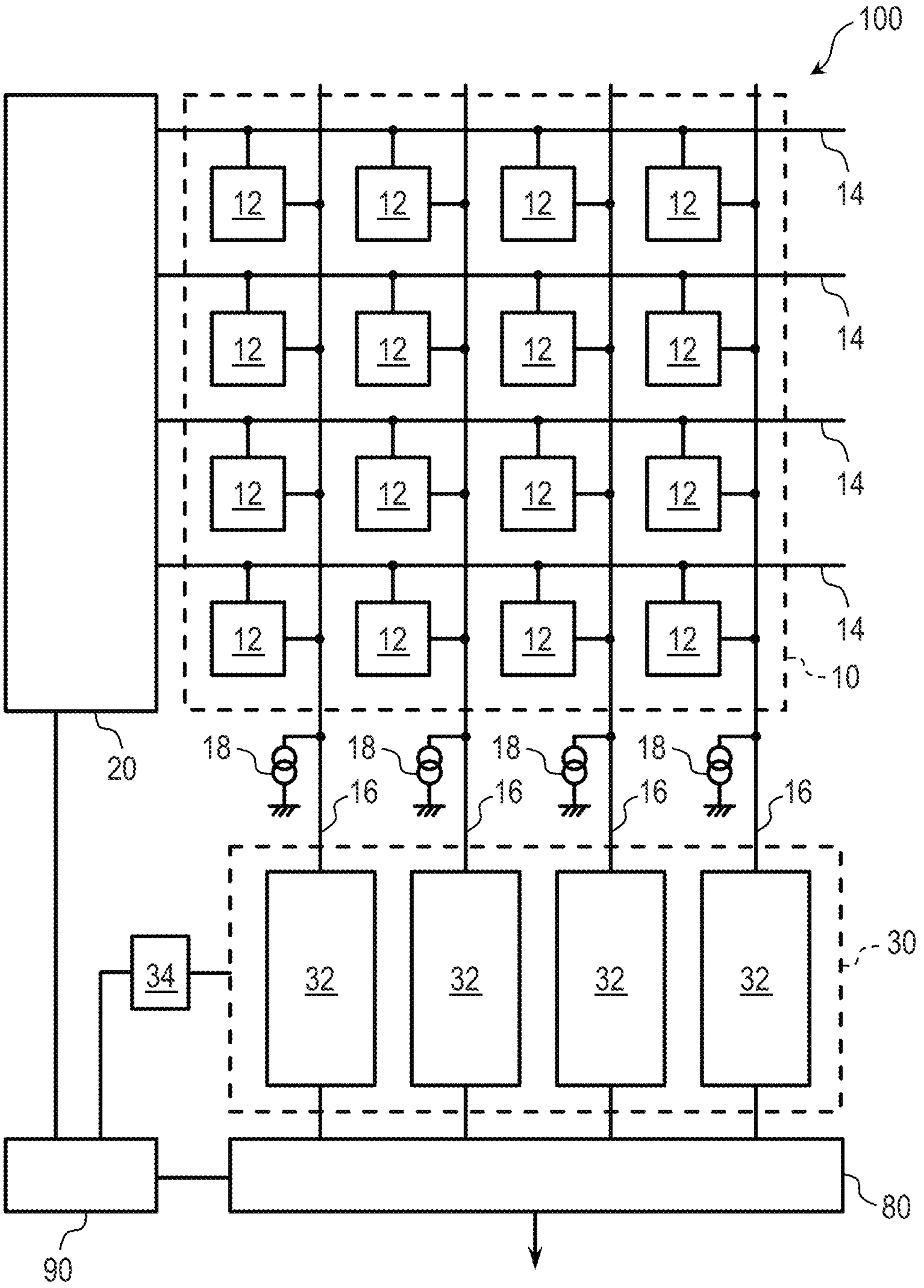
FIG. 14 is a block diagram illustrating a schematic configuration of a photoelectric conversion device according to a fourth embodiment.
Figure 15:
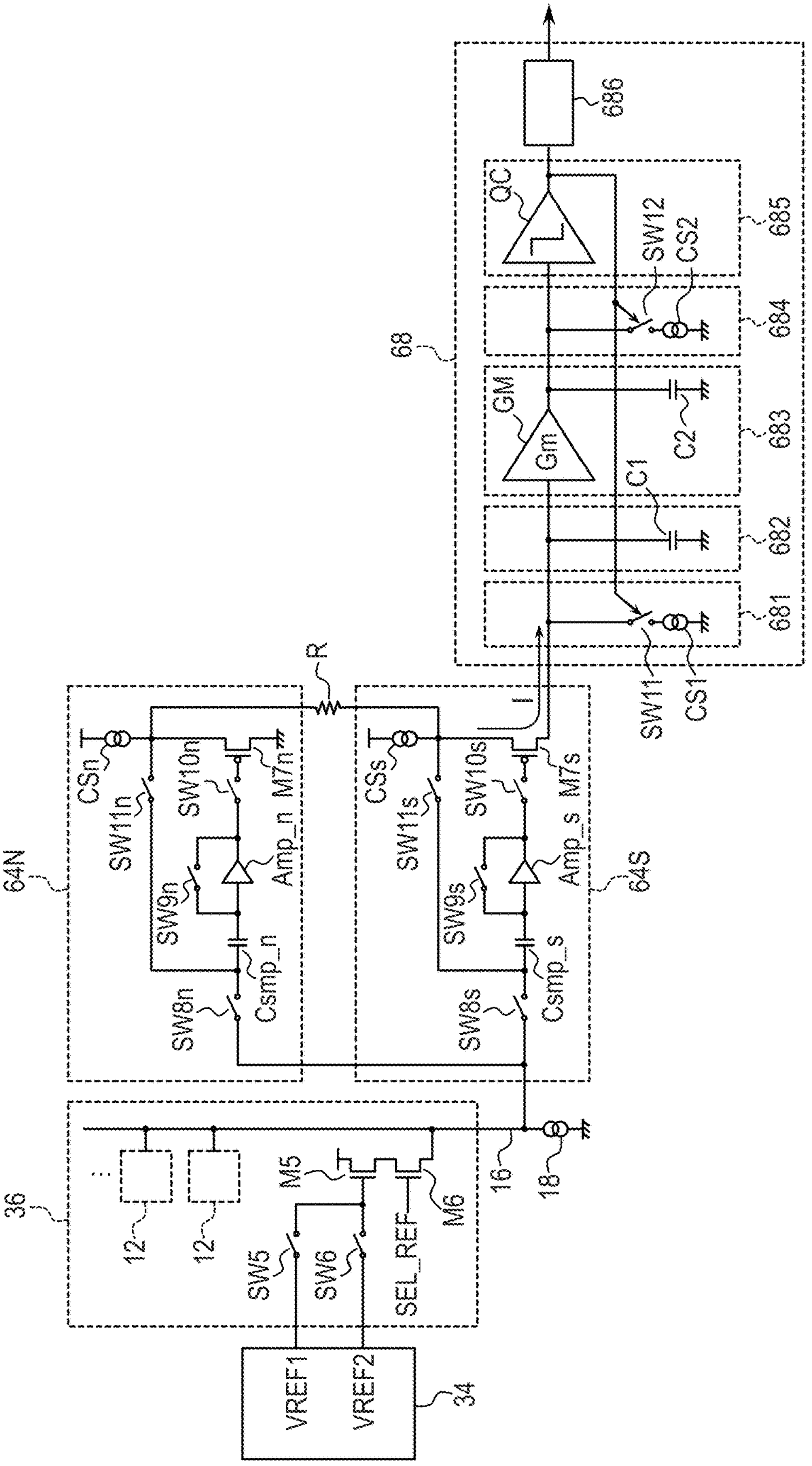
FIG. 15 is a circuit diagram illustrating a configuration example of a column circuit of the photoelectric conversion device according to the fourth embodiment.

A photoelectric conversion device according to a fourth embodiment of the present invention will be described with reference to FIG. 14 and FIG. 15. The same components as those of the photoelectric conversion devices according to the first to third embodiments are denoted by the same reference numerals, and description thereof will be omitted or simplified. FIG. 14 is a block diagram illustrating a schematic configuration of the photoelectric conversion device according to the present embodiment. FIG. 15 is a circuit diagram illustrating a configuration example of a column circuit of the photoelectric conversion device according to the present embodiment.

In the first to third embodiments, the photoelectric conversion device in which the AD converter of the column circuit 32 is configured by a ramp-type AD converter is described. In the present embodiment, a photoelectric conversion device in which the AD converter of the column circuit 32 is configured by a delta-sigma AD converter is described. The delta-sigma AD converter is an oversampling-type AD converter that performs AD conversion based on an output signal of a pixel circuit. As illustrated in FIG. 14, in the photoelectric conversion device using the delta-sigma AD converter, the reference signal output circuit 48 and the counter circuit 56 are not necessary. The output of the column circuit 32 of each column may be directly input to the signal processing circuit 80 without the horizontal output line 62 as illustrated in FIG. 14, for example. The same applies to the first to third embodiments.

As illustrated in FIG. 15, the column circuit 32 of the photoelectric conversion device according to the present embodiment includes a standard signal output circuit 36, sample-and-hold units 64N and 64S, a resistor R, and an AD conversion unit 68. The sample-and-hold unit 64N has a function of sampling and holding a signal of a reset level output from the pixel 12 or a signal corresponding to a pixel reset level based on a reference potential output from the standard signal output circuit 34. The sample-and-hold unit 64S has a function of sampling and holding a signal of a light amplitude level output from the pixel 12 or a signal corresponding to a light amplitude level based on a reference potential output from the standard signal output circuit 34. A resistor R that generates a current according to a potential difference between a signal held in the output unit of the sample-and-hold unit 64N and a signal held in the output unit of the sample-and-hold unit 64S is connected. The AD conversion unit 68 is a delta-sigma AD conversion circuit. The standard signal output circuit 36, the sample-and-hold units 64N and 64S, the resistor R, and the AD conversion unit 68 are provided for each of the signal output lines 16.

As illustrated in, e.g., FIG. 15, the standard signal output circuit 36 may include switches SW5 and SW6, an amplifier transistor M5, and a select transistor M6. The standard signal VREF1 is supplied from the standard signal output circuit 34 to one terminal of the switch SW5. The standard signal VREF2 is supplied from the standard signal output circuit 34 to one terminal of the switch SW6. The other terminal of the switch SW5 and the other terminal of the switch SW6 are connected to a gate of the amplifier transistor M5. A drain of the amplifier transistor M5 is connected to a node to which a power supply voltage (voltage VDD) is supplied. A source of the amplifier transistor M5 is connected to a drain of the select transistor M6. A source of the select transistor M6 is connected to the signal output line 16.

The switch SW5 is a switch driven by a control signal REF_1. The switch SW6 is a switch driven by a control signal REF_2. The switches SW5 and SW6 are turned on when the corresponding control signal is at high-level and turned off when the corresponding control signal is at low-level, for example. In this case, the standard signal VREF1 is supplied to the gate of the amplifier transistor M5 when the control signal REF_1 is at high-level, and the standard signal VREF2 is supplied to the gate of the amplifier transistor M5 when the control signal REF_2 is at high-level. The standard signal VREF1 is a voltage corresponding to the reset level of the pixel 12, and the standard signal VREF2 is a voltage corresponding to the light amplitude level of the pixel 12.

As illustrated in, e.g., FIG. 15, the sample-and-hold unit 64N may include switches SW8*n*, SW9*n*, SW10*n*, and SW11*n*, a capacitor Csmp_n, an inverting amplifier Amp_n, a p-channel transistor M7*n*, and a current source CSn. One terminal of the switch SW8*n* is connected to the signal output line 16. The other terminal of the switch SW8*n* is connected to one terminal of the capacitor Csmp_n and one terminal of the switch SW11*n*. The other terminal of the capacitor Csmp_n is connected to an input node of the inverting amplifier Amp_n. The switch SW9*n* is connected between the input node and an output node of the inverting amplifier Amp_n. The output node of the inverting amplifier Amp_n is connected to one terminal of the switch SW10*n*. The other terminal of the switch SW10*n* is connected to a gate of the p-channel transistor M7*n*. A drain of the p-channel transistor M7*n* is connected to the ground voltage node. A source of the p-channel transistor M7*n* is connected to the other terminal of the switch SW11*n*, one terminal of the current source CSn, and one terminal of the resistor R. The other terminal of the current source CSn is connected to a node to which a power supply voltage (voltage VDD) is supplied.

The switch SW8*n* is a switch driven by a control signal Smp_n and connects the signal output line 16 and the capacitor Csmp_n by turning on. When the switch SW8*n* is turned on while the reset signal (or the signal based on the reset level) is output to the signal output line 16, the reset signal (the signal based on the reset level) is accumulated in the capacitor Csmp_n. The switch SW9*n* is a switch driven by a control signal Smpa_n and connects the input node and the output node of the inverting amplifier Amp_n by turning on. The switches SW10*n* and SW11*n* are switches driven by a control signal Hold_s and input a signal corresponding to a signal accumulated in the capacitor Csmp_n to a subsequent source follower circuit including the p-channel transistor M7*n* and the current source CSn by turning on. The switches SW8*n*, SW9*n*, SW10*n*, and SW11*n* are turned on when the corresponding control signal is at high-level and turned off when the corresponding control signal is at low-level, for example.

As illustrated in, e.g., FIG. 15, the sample-and-hold unit 64S may include switches SW8*s*, SW9*s*, SW10*s*, and SW11*s*, a capacitor Csmp_s, an inverting amplifier Amp_s, a p-channel transistor M7*s*, and a current source CSs. One terminal of the switch SW8*s* is connected to the signal output line 16. The other terminal of the switch SW8*s* is connected to one terminal of the capacitor Csmp_s and one terminal of the switch SW11*s*. The other terminal of the capacitor Csmp_s is connected to an input node of the inverting amplifier Amp_s. The switch SW9*s* is connected between the input node and an output node of the inverting amplifier Amp_s. The output node of the inverting amplifier Amp_s is connected to one terminal of the switch SW10*s*. The other terminal of the switch SW10*s* is connected to a gate of the p-channel transistor M7*s*. A source of the p-channel transistor M7*s* is connected to the other terminal of the switch SW11*s*, one terminal of the current source CSs, and the other terminal of the resistor R. The other terminal of the current source CSs is connected to a node to which a power supply voltage (voltage VDD) is supplied.

The switch SW8*s* is a switch driven by a control signal Smp_s and connects the signal output line 16 and the capacitor Csmp_s by turning on. When the switch SW8*s* is turned on while the light signal (or the signal based on the light amplitude level) is output to the signal output line 16, the light signal (the signal based on the light amplitude level) is accumulated in the capacitor Csmp_s. The switch SW9*s* is a switch driven by a control signal Smpa_s and connects the input node and the output node of the inverting amplifier Amp_s by turning on. The switches SW10s and SW11s are switches driven by a control signal Hold_s and input a signal corresponding to a signal accumulated in the capacitor Csmp_s to a subsequent source follower circuit configured by the p-channel transistor M7s and the current source CSs by turning on. The switches SW8s, SW9s, SW10s, and SW11s are turned on when the corresponding control signal is at high-level and turned off when the corresponding control signal is at low-level, for example.

The inverting amplifiers Amp_n and Amp_s may be configured by, for example, a common source circuit. The inverting amplifier Amp_n has the input node connected to the capacitot Csmp_n and the output node connected to the subsequent source follower circuit. Similarly, the inverting amplifier Amp_s has the input node connected to the capacitor Csmp_s, and the output node connected to the subsequent source follower circuit via the switch SW10s. The resistor R is connected between the output nodes of these source follower circuits. Accordingly, the current I flowing through the resistor R is represented by the following Expression (1). Here, Vn is a potential of the output node of the sample-and-hold unit 64N (the potential based on the pixel reset level), Vs is a potential of the output node of the sample-and-hold unit 64S (the potential based on the light amplitude level), and R is a resistance value of the resistor R.

$$I=(Vn-Vs)/R \qquad (1)$$

Since the current I flowing through the resistor R is proportional to the difference between the potential Vn based on the reset level of the pixel 12 and the potential Vs based on the light amplitude level, the CDS process is performed at the stage where the current I is input to the AD conversion unit 68. The current I is input to the AD conversion unit 68.

The AD conversion unit 68 is a Σ-Δ type AD conversion circuit, and may include a first DA conversion circuit 681, a first integration circuit 682, a second integration circuit 683, a second DA conversion circuit 684, a quantization circuit 685, and a decimation filter 686, as illustrated in, e.g., FIG. 15. The first integration circuit 682 includes an integration capacitor C1. The second integration circuit 683 includes a Gm cell GM that performs voltage-current conversion on the voltage value integrated by the first integration circuit 682, and an integration capacitor C2. The quantization circuit 685 includes a quantizer QC. The first DA conversion circuit 681 including a current source CS1 and a switch SW11 controlled by an output signal of the quantizer QC is connected to an input node of the first integration circuit 682. Accordingly, a current to the first integration circuit 682 is controlled in accordance with a digital signal output via the second integration circuit 683 and the quantization circuit 685. A second DA conversion circuit 684 having a current source CS2 and a switch SW12 controlled by the output signal of the quantizer QC is connected to an output node of the second integration circuit 683. Accordingly, a current to the second integration circuit 683 is controlled according to a result of quantization of the output of the second integration circuit 683 by the quantizer QC.

In the AD conversion unit 68, an operation of feeding back the previous quantized value by the quantization circuit 685 to the second integration circuit 683 and the first integration circuit 682 through the DA converter is performed. As described above, by feeding back the previous quantized value to the DA conversion circuit and passing through the integration circuit twice, the second-order noise shaping characteristic may be obtained. Further, by removing the high-frequency noise by the decimation filter 686 disposed in the subsequent stage of the quantization circuit 685, it is possible to obtain an analog-to-digital conversion output with high accuracy.

Figure 16:
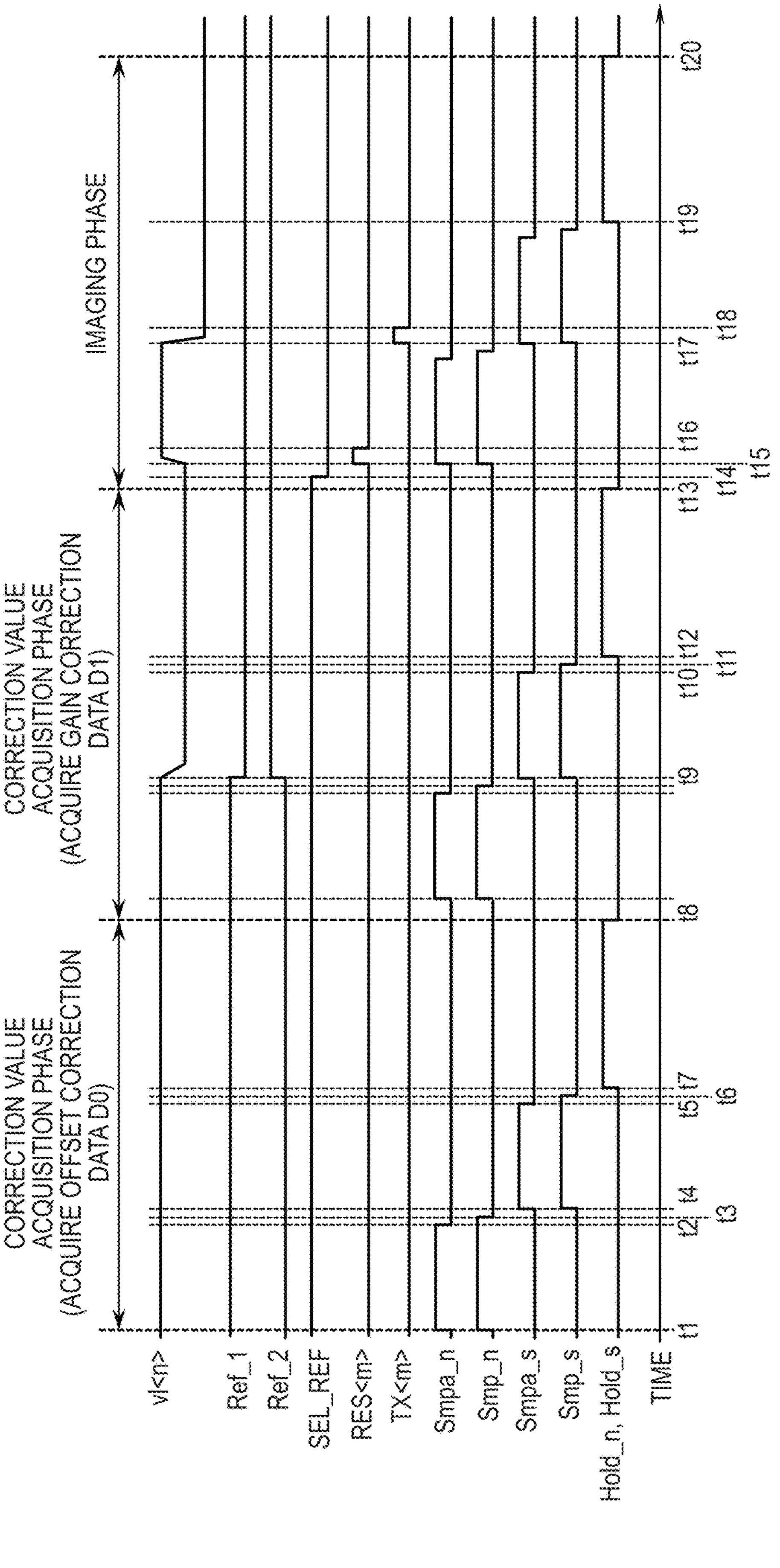
FIG. 16 is a timing chart illustrating a method of driving the photoelectric conversion device according to the fourth embodiment.

Next, a method of driving the photoelectric conversion device according to the present embodiment will be described with reference to FIG. 16. FIG. 16 is a timing chart illustrating a method of driving the photoelectric conversion device according to the present embodiment. FIG. 16 illustrates waveforms of the voltage v1 of the signal output line 16, the control signals Ref_1, Ref_2, SEL_REF, RES, TX, Smpa_n, Smp_n, Smpa_s, Smp_s, Hold_n, and Hold_s. Here, <m> attached to the reference numerals of the control signals RES and TX represents a row number, and <n> attached to the voltage v1 represents a column number. FIG. 16 illustrates an operation of reading out signals from the pixel 12 arranged in the m-th row and the n-th column of the pixel array unit 10. Note that it is assumed that each switch is in an on state (a conductive state) in a period in which the corresponding control signal is at high-level and is in an off state (a non-conductive state) in a period in which the corresponding control signal is at low-level.

The operation illustrated in FIG. 16 is roughly divided into a correction value acquisition phase for acquiring an offset correction data D0, a correction value acquisition phase for acquiring a gain correction data D1, and an imaging phase. The offset correction data D0 is a correction data used to correct an offset component for each column. The gain correction data D1 is a correction data used to correct a gain component for each column. In the imaging phase, processing is performed on the output signal from the pixel 12 based on the acquired offset information and gain information.

A period from time t1 to time t8 is a correction value acquisition phase in which the offset correction data D0 is acquired. Just before the time t1, the control signals Ref_2, RES<m>, TX<m>, Smpa_n, Smp_n, Smpa_s, Smp_s, Hold_n, and Hold_s are at low-level, and the control signals Ref_1 and SEL_REF are at high-level.

At the time t1, the timing generation unit 90 controls the control signal Ref_1 to high-level, controls the control signal Ref_2 to low-level, and controls the control signal SEL_REF to high-level. Accordingly, the switch SW5 is turned on, the switch SW6 is turned off, and the standard signal VREF1 is supplied to the gate of the amplifier transistor M5. In addition, the select transistor M6 is turned on in response to the high-level control signal SEL_REF, and a signal (voltage v1<n>) generated by the amplifier transistor M5 based on the standard signal VREF1 is output to the signal output line 16 via the select transistor M6.

The standard signal VREF1 is generated by the standard signal output circuit 34 provided in the signal processing substrate 140 and input to the standard signal output unit 40 provided in the pixel substrate 110 via the connection portion 112, as in the above-described embodiments. Similarly to the standard signal VREF1, the standard signal VREF2 is also generated by the standard signal output circuit 34 provided in the signal processing substrate 140 and is input to the standard signal output unit 40 provided in the pixel substrate 110 via the connection portion 112.

At time t1, the timing generation unit 90 also controls the control signals Smp_n and Smpa_n from low-level to high-level. As a result, the switches SW9*n* and SW10*n* are turned on, and the sample-and-hold unit 64N for the reset signal is connected to the signal output line 16.

At the subsequent time t2, the timing generation unit 90 controls the control signal Smpa_n from high-level to low-level. As a result, the switch SW10*n* is turned off. A potential Vn corresponding to a pixel reset level based on the standard signal VREF1 is sampled in the capacitor Csmp_n.

At the subsequent time t3, the timing generation unit 90 controls the control signal Smp_n from high-level to low-level. Accordingly, the switch SW9*n* is turned off, and the sample-and-hold unit 64N is disconnected from the signal output line 16.

At the subsequent time t4, the timing generation unit 90 controls the control signals Smp_s and Smpa_s from low-level to high-level. As a result, the switches SW9*s* and SW10*s* are turned on, and the sample-and-hold unit 64S for the light signal is connected to the signal output line 16.

At the subsequent time t5, the timing generation unit 90 controls the control signal Smpa_s from high-level to low-level. As a result, the switch SW10*s* is turned off. The potential Vn corresponding to the pixel reset level based on the standard signal VREF1 is sampled in the capacitor Csmp_s.

At the subsequent time t6, the timing generation unit 90 controls the control signal Smp_s from high-level to low-level. Accordingly, the switch SW9*s* is turned off, and the sample-and-hold unit 64S is disconnected from the signal output line 16.

The inter-terminal voltage of the switch SW9*s* when the switch SW9*s* is turned off at the time t6 is always substantially the same regardless of the potential of the signal output line 16. Therefore, the error of the gain component is not superimposed on the signal accumulated in the capacitor Csmp_s due to the charge injection caused by the off operation of the switch SW9*s*. Further, when the switch SW9*s* is turned off at the time t6, since both terminals of the capacitor Csmp_s are in the high impedance state, there is no influence of the off operation of the switch SW9*s*. Due to these effects, it is possible to suppress the gain error with respect to the signal held in the capacitor Csmp_s.

In the subsequent period from time t7 to time t8, the timing generation unit 90 controls the control signal Hold_n from low-level to high-level. As a result, the switches SW10*n* and SW11*n* are turned on, and a signal based on the standard signal VREF1 is output from the capacitor Csmp_n to the subsequent source follower circuit. Similarly, in the period from the time t7 to the time t8, the timing generation unit 90 controls the control signal Hold_s from low-level to high-level. As a result, the switches SW10*s* and SW11*s* are turned on, and a signal based on the standard signal VREF1 is output from the capacitor Csmp_s to the subsequent source follower circuit. As a result, a current I corresponding to the potential difference between the output node of the sample-and-hold unit 64N and the output node of the sample-and-hold unit 64S flows through the resistor R, and the current I is input to the AD conversion unit 68. By performing the AD conversion of the current I in the AD conversion unit 68, the offset correction data D0(*n*) of each column may be acquired (n is an integer representing a column number).

A period from the time t8 to time t13 is a correction value acquisition phase in which the gain correction data D1 is acquired. The operation in the correction value acquisition phase in which the gain correction data D1 is acquired is the same as the operation in the correction value acquisition phase in which the offset correction data D0 is acquired, except that the standard signal supplied to the amplifier transistor M5 is different. Description of portions common to the correction value acquisition phase for acquiring the offset correction data D0 will be omitted as appropriate.

A period from the time t8 to time t9, that is, the operation until the signal based on the standard signal VREF1 is sampled by the sample-and-hold unit 64N is the same as the operation from the time t1 to the time t4.

At the subsequent time t9, the timing generation unit 90 controls the control signal Ref_1 from high-level to low-level and controls the control signal Ref_2 from low-level to high-level. Accordingly, the switch SW5 is turned off and the switch SW6 is turned on, and the standard signal VREF2 is supplied to the gate of the amplifier transistor M5. A signal (voltage v1<n>) generated by the amplifier transistor M5 based on the standard signal VREF2 is output to the signal output line 16 via the select transistor M6.

At the time t9, the timing generation unit 90 also controls the control signals Smp_s and Smpa_s from low-level to high-level. As a result, the switches SW9*s* and SW10*s* are turned on, and the sample-and-hold unit 64S for the light signal is connected to the signal output line 16.

At the subsequent time t10, the timing generation unit 90 controls the control signal Smpa_s from high-level to low-level. As a result, the switch SW10*s* is turned off. The potential Vs corresponding to the light amplitude level based on the standard signal VREF2 is sampled in the capacitor Csmp_s.

At the subsequent time t11, the timing generation unit 90 controls the control signal Smp_s from high-level to low-level. As a result, the switch SW9*s* is turned off, and the sample-and-hold unit 64S is disconnected from the signal output line 16.

In the subsequent period from time t12 to the time t13, the timing generation unit 90 controls the control signal Hold_n from low-level to high-level. As a result, the switches SW10*n* and SW11*n* are turned on, and a signal based on the standard signal VREF1 is output from the capacitor Csmp_n to the subsequent source follower circuit. Similarly, in the period from the time t12 to the time t13, the timing generation unit 90 controls the control signal Hold_s from low-level to high-level. As a result, the switches SW10*s* and SW11*s* are turned on, and a signal based on the standard signal VREF2 is output from the capacitor Csmp_s to the subsequent source follower circuit. As a result, a current I corresponding to the potential difference between the output node of the sample-and-hold unit 64N and the output node of the sample-and-hold unit 64S flows through the resistor R, and the current I is input to the AD conversion unit 68. By performing the AD conversion of the current I in the AD conversion unit 68, the gain correction data D1(*n*) of each column may be acquired (n is an integer representing a column number).

A period from the time t13 to time t20 is the imaging phase. First, at time t14 after the control signals Hold_n and Hold_s transition to low-level at the time t13, the timing generation unit 90 controls the control signal SEL_REF from high-level to low-level. As a result, the select transistor M6 is turned off, and the signal output line 16 is disconnected from the standard signal output circuit 36.

In the subsequent period from time t15 to time t16, the timing generation unit 90 controls the control signal RES<m> from low-level to high-level. As a result, the node FD of the pixel 12 is reset, and the voltage v1 corresponding to the reset potential of the node FD is output to the signal output line 16. The voltage v1 of the signal output line 16 at this time is the pixel reset level.

At the time t15, the timing generation unit 90 also controls the control signals Smpa_n and Smp_n from low-level to high-level as in the period from the time t1 to the time t3. As a result, the switches SW8*n* and SW9*n* are turned on, and the signal of the pixel reset level is sampled by the sample-and-hold unit 64N.

In the subsequent period from time t17 to time t18, the vertical scanning circuit 20 controls the control signal TX from low-level to high-level. As a result, the charge accumulated in the photoelectric conversion element PD is transferred to the node FD, and the voltage v1 corresponding to the amount of the charge transferred to the node FD is output to the signal output line 16. The voltage v1 of the signal output line 16 at this time is the light amplitude level.

At the time t17, the timing generation unit 90 controls the control signals Smpa_s and Smp_s from low-level to high-level as in the period from the time t9 to the time t11. As a result, the switches SW8*s* and SW9*s* are turned on, and the signal of the light amplitude level is sampled by the sample-and-hold unit 64S.

In the subsequent period from time t19 to the time t20, the timing generation unit 90 controls the control signal Hold_n from low-level to high-level. As a result, the switches SW10*n* and SW11*n* are turned on, and a signal based on the pixel reset level is output from the capacitor Csmp_n to the subsequent source follower circuit. Similarly, in the period from the time t19 to the time t20, the timing generation unit 90 controls the control signal Hold_s from low-level to high-level. As a result, the switches SW10*s* and SW11*s* are turned on, and a signal based on the light amplitude level is output from the capacitor Csmp_s to the subsequent source follower circuit. As a result, a current I corresponding to the potential difference between the output node of the sample-and-hold unit 64N and the output node of the sample-and-hold unit 64S flows through the resistor R, and the current I is input to the AD conversion unit 68. By performing the AD conversion of the current I in the AD conversion unit 68, pixel data of each column may be acquired.

Figure 17:
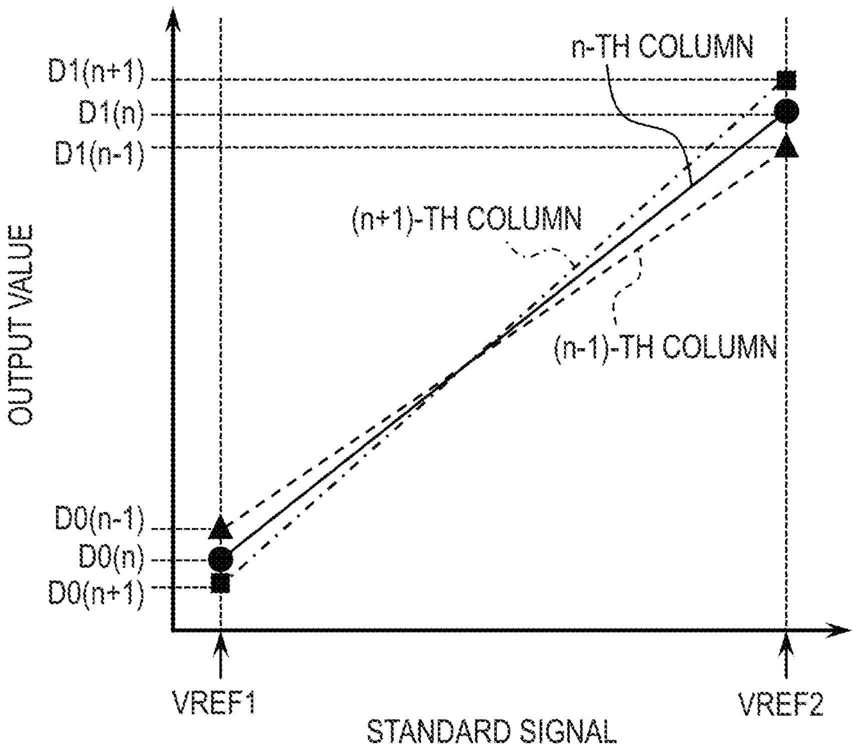
FIG. 17 is a graph illustrating a correction value generation method in the photoelectric conversion device according to the fourth embodiment.

FIG. 17 is a graph illustrating a correction value generation method using the offset correction data D0 and the gain correction data D1 acquired in the correction value acquisition phases. In FIG. 17, the horizontal axis indicates the level of the standard signal, and the vertical axis indicates the output value. The offset correction data D0 and the gain correction data D1 are acquired for each column as described above.

In FIG. 17, the offset correction data D0, in which the reset level and the light amplitude level used in the CDS process are both based on the standard signal VREF1, is equivalent to a signal corresponding to darkness, and the offset correction data D0 itself may be used as an offset correction value. By calculating the difference between the offset correction value (offset correction data D0) and the pixel data of the same column acquired in the imaging phase, offset correction including the process variation component on the pixel substrate 110 may be performed.

Further, in FIG. 17, the gain correction value may be calculated from the gain correction data D1 in which the reset level is acquired from the potential based on the standard signal VREF1 and the light amplitude level is acquired from the potential based on the standard signal VREF2. For example, the gain correction value may be obtained by calculating the difference value (D1−D0) between the offset correction data D0 and the gain correction data D1 for each column and calculating the ratio of the difference value (D1−D0) of each column to the average value of the difference values (D1−D0) of all columns. By dividing the gain correction value of each column with respect to the pixel data of the same column acquired in the imaging phase, it is possible to perform gain correction with high correlation with the pixel signal, including linearity of the pixel transistors.

Although the present embodiment has been described on the basis of the configuration including the sample-and-hold unit 64N for the reset signal and the sample-and-hold unit 64S for the light signal, the present invention is not limited thereto. For example, the present invention may be similarly applied to a case where three or more sample-and-hold units are provided for multi-sampling, and in this case, the same effect may be obtained by acquiring a correction value for each sample-and-hold unit.

As described above, according to the present embodiment, in the photoelectric conversion device configured by bonding the pixel substrate and the signal processing substrate together, the image quality and the operation speed may be improved.

Fifth Embodiment

Figure 18:
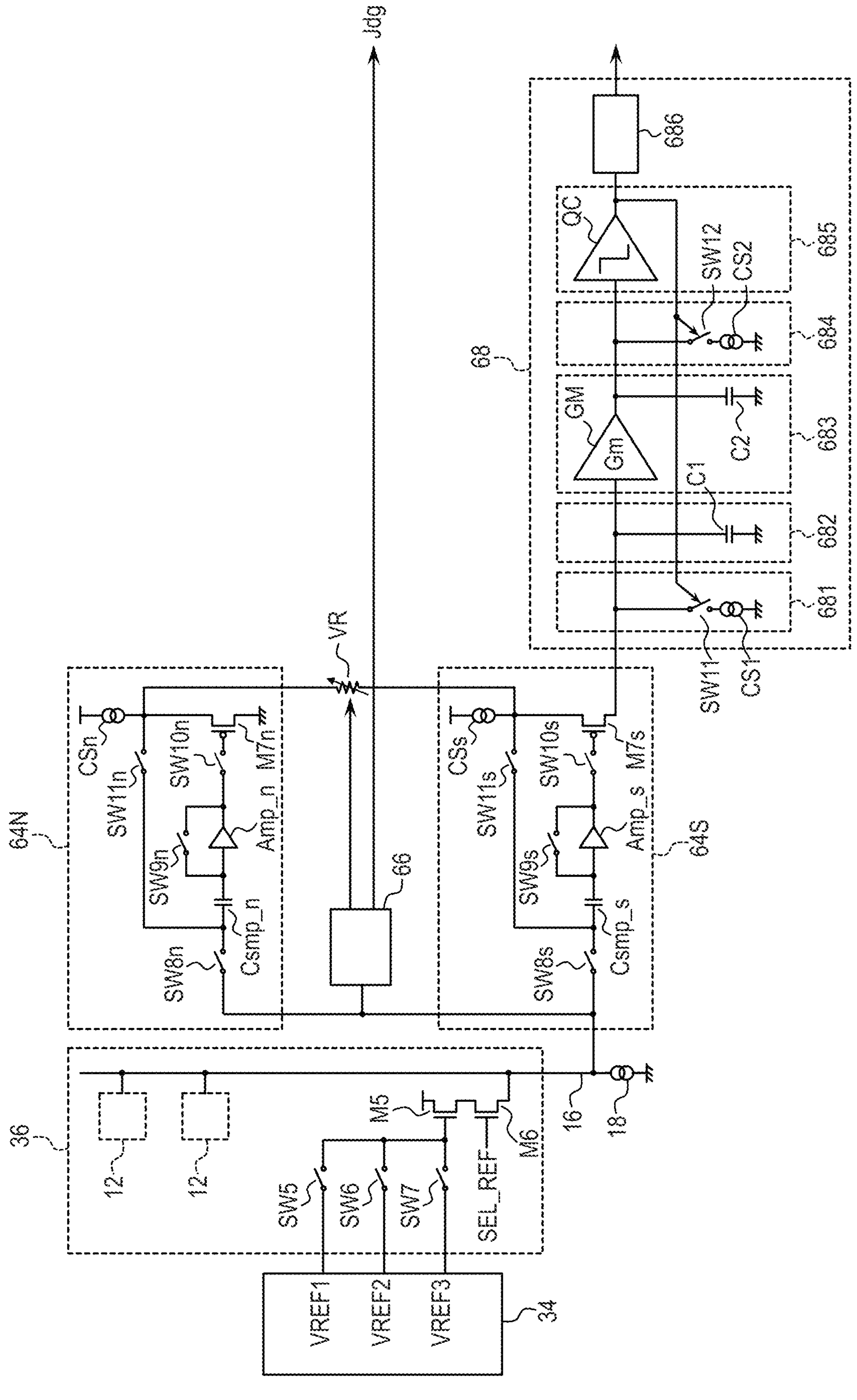
FIG. 18 is a circuit diagram illustrating a configuration example of a column circuit of a photoelectric conversion device according to a fifth embodiment.

A photoelectric conversion device according to a fifth embodiment of the present invention will be described with reference to FIG. 18. The same components as those of the photoelectric conversion devices according to the first to fourth embodiments are denoted by the same reference numerals, and description thereof will be omitted or simplified. FIG. 18 is a circuit diagram illustrating a configuration example of a column circuit of the photoelectric conversion device according to the present embodiment.

A configuration in which the gain of the readout circuit 30 is switched according to the amount of light as described in the second embodiment may be applied to, e.g., the photoelectric conversion device of the fourth embodiment. In the present embodiment, a configuration example in a case where a gain switching function is applied to the photoelectric conversion device of the fourth embodiment will be described. In the present embodiment, differences from the photoelectric conversion device according to the fourth embodiment will be mainly described, and description of points similar to those of the photoelectric conversion device according to the fourth embodiment will be appropriately omitted.

In the column circuit 32 of the photoelectric conversion device according to the present embodiment, as illustrated in, e.g., FIG. 18, the standard signal output circuit 36 further includes a switch SW7 in addition to the switches SW5 and SW6, the amplifier transistor M5, and the select transistor M6. The standard signal VREF3 is supplied from the standard signal output circuit 34 to one terminal of the switch SW7. The other terminal of the switch SW7 is connected to the gate of the amplifier transistor M5. That is, the standard signal output circuit 36 is configured to supply any of the three types of standard signals VREF1, VREF2, and VREF3 to the gate of the amplifier transistor M5 depending on the connection state of the switches SW5, SW6, and SW7. Here, the standard signal VREF1 is a voltage corresponding to a reset level, the standard signal VREF2 is a voltage corresponding to a low-luminance light amplitude level, and the standard signal VREF3 is a voltage corresponding to a high-luminance light amplitude level.

The column circuit 32 according to the present embodiment further includes a determination unit 66. The determination unit 66 is connected to the signal output line 16 and the resistor R (variable resistor VR) and is configured to change the resistance value of the variable resistor VR according to the amount of a signal appearing in the signal output line 16. By changing the resistance value of the variable resistor VR, it is possible to control the conversion gain at the time of current conversion of the differential voltage of the signals held in the sample-and-hold units 64N and 64S. Further, the determination unit 66 is configured to output a determination signal jdg corresponding to the amount of signal appearing on the signal output line 16 to the signal processing circuit 80 in the subsequent stage.

Figure 19:
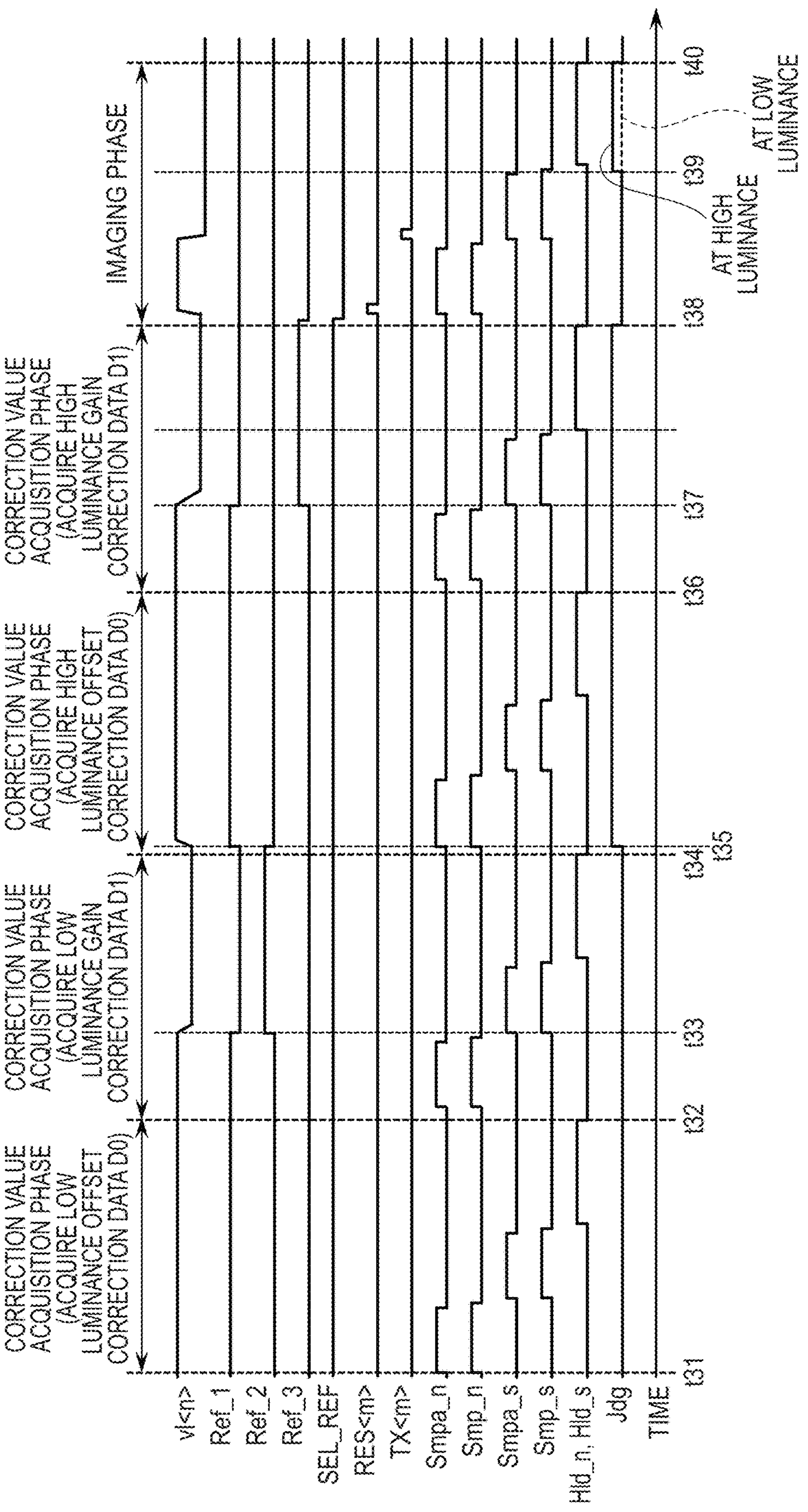
FIG. 19 is a timing chart illustrating a method of driving the photoelectric conversion device according to the fifth embodiment.

Next, a method of driving the photoelectric conversion device according to the present embodiment will be described with reference to FIG. 19. FIG. 19 is a timing chart illustrating a method of driving the photoelectric conversion device according to the present embodiment. FIG. 19 illustrates waveforms of the voltage v1 of the signal output line 16, the control signals Ref_1, Ref_2, Ref_3, SEL_REF, RES<m>, TX<m>, Smpa_n, Smp_n, Smpa_s, Smp_s, Hold_n, Hold_s, and the determination signal jdg. Here, <m> attached to the reference numerals of the control signals RES and TX represents a row number, and <n> attached to the voltage v1 represents a column number. FIG. 19 illustrates an operation of reading out signals from the pixel 12 arranged in the m-th row and the n-th column of the pixel array unit 10. Note that it is assumed that each switch is in an on state (a conductive state) in a period in which the corresponding control signal is at high-level and is in an off state (a non-conductive state) in a period in which the corresponding control signal is at low-level.

The operation illustrated in FIG. 19 is roughly divided into a correction value acquisition phase for acquiring an offset correction data D0, a correction value acquisition phase for acquiring a gain correction data D1, and an imaging phase. The correction value acquisition phase for acquiring the offset correction data D0 is divided into a correction value acquisition phase for acquiring an offset correction data D0 at the time of low luminance (hereinafter called a "low luminance offset correction data D0") and a correction value acquisition phase for acquiring an offset correction data D0 at the time of high luminance (herein after called a "high luminance offset collection data D0"). The correction value acquisition phase for acquiring the gain correction data D1 is divided into a correction value acquisition phase for acquiring a gain correction data D1 at the low luminance (hereinafter called a "low luminance gain correction data D1") and a correction value acquisition phase for acquiring a gain correction data D1 at the high luminance (hereinafter called a "high luminance gain correction data D1").

In FIG. 19, a period from time t31 to time t32 is a correction value acquisition phase in which the low luminance offset correction data D0 is acquired. A period from time t32 to time t34 is a correction value acquisition phase in which the low luminance gain correction data D1 is acquired. A period from time t34 to time t36 is a correction value acquisition phase in which the high luminance offset correction data D0 is acquired. A period from time t36 to time t38 is a correction value acquisition phase in which the high luminance gain correction data D1 is acquired. A period from time t38 to time t40 is the imaging phase.

In a period from the time t31 to the time t32, the low luminance offset correction data D0 is acquired based on the standard signal VREF1. The specific operation is the same as the operation in the period from the time t1 to the time t8 in FIG. 16 except that the control signal Ref_3 is controlled to low-level.

During a period from the time t32 to the time t34, the standard signal VREF1 is switched to the standard signal VREF2 at time t33 to acquire the low luminance gain correction data D1. The specific operation is the same as the operation in the period from the time t8 to the time t13 in FIG. 16 except that the control signal Ref_3 is controlled to low-level.

In the subsequent period from the time t34 to the time t36, after switching from the standard signal VREF2 to the standard signal VREF1 at time t35, the high luminance offset correction data D0 is acquired based on the standard signal VREF1. The specific operation is the same as the operation in the period from the time t1 to the time t8 in FIG. 16 except that the control signal Ref_3 is controlled to low-level.

During a period from the time t36 to the time t38, the standard signal VREF1 is switched to the standard signal VREF3 at time t37 to acquire the high luminance gain correction data D1. The specific operation is the same as the operation in the period from the time t8 to the time t13 in FIG. 16 except that the control signal Ref_2 is controlled to low-level and the control signal Ref_3 is controlled to high-level.

In the subsequent period from the time t38 to time t39, the same imaging phase as in the period from the time t13 to the time t20 in FIG. 16 is performed to acquire the pixel data of each pixel 12. The offset correction data D0, the gain correction data D1, and the pixel data thus acquired are transferred to the signal processing circuit 80 in the subsequent stage. In addition, the determination unit 66 outputs, e.g., a high-level determination signal jdg when an object is determined to have high luminance, or outputs, e.g., a low-level determination signal jdg when an object is determined to have low luminance to the signal processing circuit 80 in the subsequent stage. The determination signal jdg may be transferred to the signal processing circuit 80, for example, in a period from the time t39 to the time t40. The determination as to whether the object has low brightness or high brightness may be performed, for example, by the same method as in the second embodiment.

The signal processing circuit 80 corrects the pixel data acquired in the imaging phase using the offset correction data D0 and the gain correction data D1 for low luminance and high luminance, respectively. At this time, whether to use the correction value for low brightness or the correction value for high brightness is selected for each pixel 12 based on the determination signal jdg indicating the determination result of the determination unit 66.

The method of inputting the standard signal used at the time of obtaining the correction value is not necessarily limited to the method illustrated in FIG. 19. For example, the offset correction data D0 and the gain correction data D1 may be calculated by calculation using the standard signals VREF1 and VREF2 as inputs and the offset correction data D0 and the gain correction data D1 as outputs, instead of directly acquiring these values. For example, a standard signal corresponding to the light amplitude level at the time of acquiring the high luminance offset correction data D0 is set as the standard signal VREF2. Then, the high luminance offset correction data D0 may be calculated by calculation using the standard signals VREF1 and VREF2, the offset correction data D0, and the gain correction data D1.

As described above, according to the present embodiment, in the photoelectric conversion device configured by bonding the pixel substrate and the signal processing substrate together, the image quality and the operation speed may be improved.

Sixth Embodiment

Figure 20:
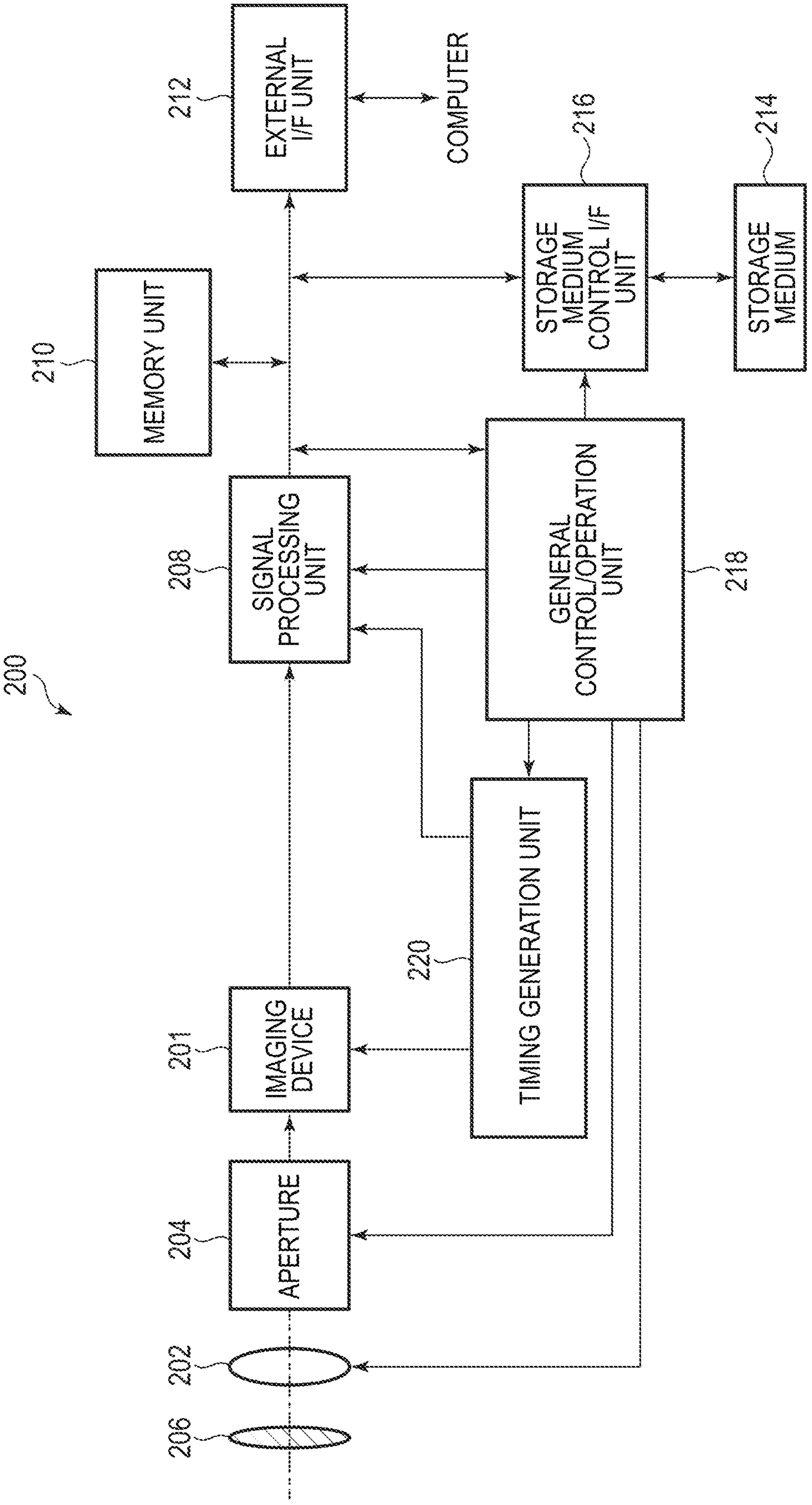
FIG. 20 is a block diagram illustrating a schematic configuration of a photoelectric conversion system according to a sixth embodiment.

A photoelectric conversion system according to a sixth embodiment of the present invention will be described with reference to FIG. 20. FIG. 20 is a block diagram illustrating a schematic configuration of the photoelectric conversion system according to the present embodiment.

The photoelectric conversion device 100 described in the first to fifth embodiments may be applied to various photoelectric conversion systems. Examples of applicable photoelectric conversion systems include digital still cameras, digital camcorders, surveillance cameras, copying machines, facsimiles, mobile phones, on-vehicle cameras, observation satellites, and the like. A camera module including an optical system such as a lens and an imaging device is also included in the photoelectric conversion system. FIG. 20 exemplifies a block diagram of a digital still camera as one of these.

The photoelectric conversion system 200 illustrated in FIG. 20 includes an imaging device 201, a lens 202 that forms an optical image of an object on the imaging device 201, an aperture 204 that changes the amount of light passing through the lens 202, and a barrier 206 that protects the lens 202. The lens 202 and the aperture 204 form an optical system that focuses light onto the imaging device 201. The imaging device 201 is the photoelectric conversion device 100 described in any of the first to fifth embodiments, and converts the optical image formed by the lens 202 into image data.

The photoelectric conversion system 200 further includes a signal processing unit 208 that processes an output signal output from the imaging device 201. The signal processing unit 208 generates image data from the digital signal output from the imaging device 201. Further, the signal processing unit 208 performs various corrections and compressions as necessary and outputs the processed image data. The imaging device 201 may include an AD conversion unit that generates a digital signal to be processed by the signal processing unit 208. The AD conversion unit may be formed in a semiconductor layer (semiconductor substrate) on which the photoelectric conversion unit of the imaging device 201 is formed or may be formed on a semiconductor layer (semiconductor substrate) different from the semiconductor layer (semiconductor substrate) on which the photoelectric conversion unit of the imaging device 201 is formed. The signal processing unit 208 may be formed on the same semiconductor layer (semiconductor substrate) as the imaging device 201.

The photoelectric conversion system 200 further includes a memory unit 210 for temporarily storing image data and an external interface unit (external I/F unit) 212 for communicating with an external computer or the like. The photoelectric conversion system 200 further includes a storage medium 214 such as a semiconductor memory for performing storing or reading out of imaging data, and a storage medium control interface unit (storage medium control I/F unit) 216 for performing storing on or reading out from the storage medium 214. The storage medium 214 may be built in the photoelectric conversion system 200 or may be detachable.

The photoelectric conversion system 200 further includes a general control/operation unit 218 that performs various calculations and controls the entire digital still camera, and a timing generation unit 220 that outputs various timing signals to the imaging device 201 and the signal processing unit 208. Here, the timing signal or the like may be input from the outside, and the photoelectric conversion system 200 may include at least the imaging device 201 and the signal processing unit 208 that processes the output signal output from the imaging device 201.

The imaging device 201 outputs an imaging signal to the signal processing unit 208. The signal processing unit 208 performs predetermined signal processing on the imaging signal output from the imaging device 201, and outputs the processed image data. The signal processing unit 208 generates an image using the imaging signal.

As described above, according to the present embodiment, it is possible to realize a photoelectric conversion system to which the photoelectric conversion device 100 according to the first to fifth embodiments is applied.

Seventh Embodiment

Figure 21A:
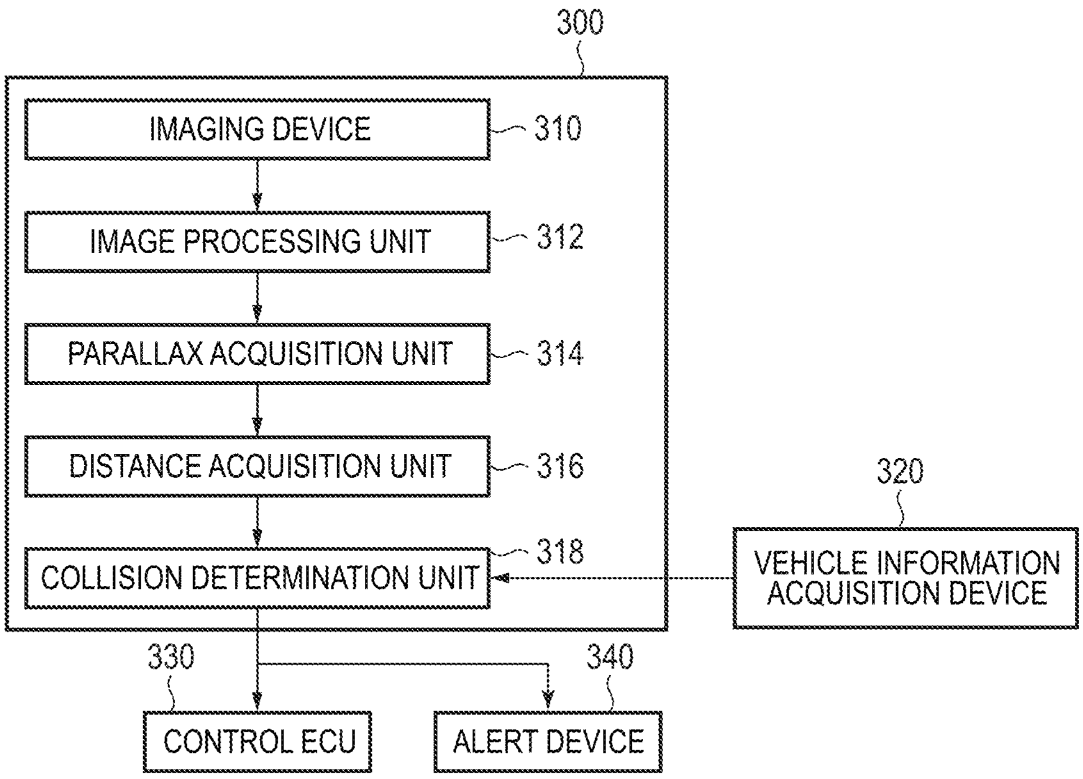
FIG. 21A is a diagram illustrating a configuration example of a photoelectric conversion system according to a seventh embodiment.
Figure 21B:
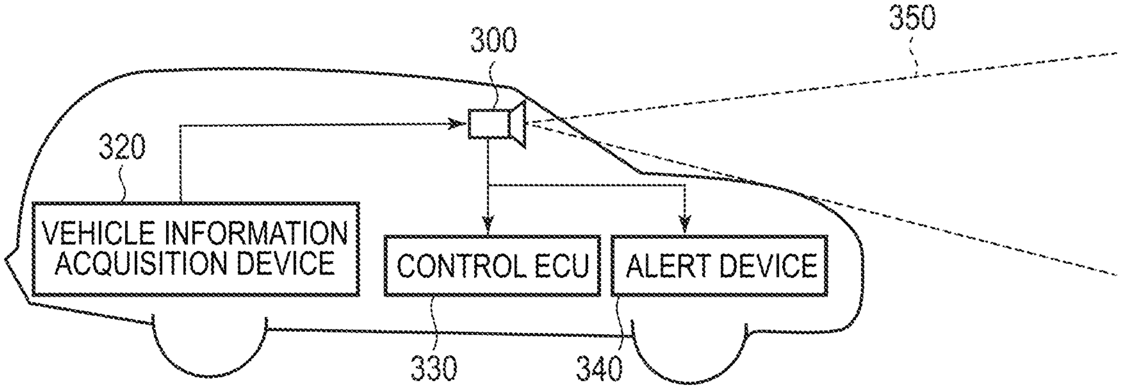
FIG. 21B is a diagram illustrating a configuration example of a movable object according to the seventh embodiment.

A photoelectric conversion system and movable object according to a seventh embodiment of the present invention will be described with reference to FIG. 21A and FIG. 21B. FIG. 21A is a diagram illustrating a configuration example of a photoelectric conversion system according to the present embodiment. FIG. 21B is a diagram illustrating a configuration of a movable object according to the present embodiment.

FIG. 21A illustrates an example of a photoelectric conversion system related to an on-vehicle camera. The photoelectric conversion system 300 includes an imaging device 310. The imaging device 310 is the photoelectric conversion device 100 according to any one of the first to fifth embodiments. The photoelectric conversion system 300 includes an image processing unit 312 that performs image processing on a plurality of image data acquired by the imaging device 310, and a parallax acquisition unit 314 that calculates parallax (phase difference of parallax images) from the plurality of pieces of image data acquired by the imaging device 310. The photoelectric conversion system 300 further includes a distance acquisition unit 316 that calculates a distance to an object based on the calculated parallax, and a collision determination unit 318 that determines whether there is a collision possibility based on the calculated distance. Here, the parallax acquisition unit 314 and the distance acquisition unit 316 are examples of a distance information acquisition unit that acquires distance information to the object. That is, the distance information is information related to a parallax, a defocus amount, a distance to the object, and the like. The collision determination unit 318 may determine the collision possibility using any of the distance information. The distance information acquisition unit may be realized by dedicatedly designed hardware or may be realized by a software module. Further, it may be realized by FPGA (Field Programmable Gate Array), ASIC (Application Specific Integrated circuit), or the like, or may be realized by a combination of these.

The photoelectric conversion system 300 is connected to the vehicle information acquisition device 320 and may acquire vehicle information such as a vehicle speed, a yaw rate, and a steering angle. Further, the photoelectric conversion system 300 is connected to a control ECU 330 which is a control device that outputs a control signal for generating a braking force to the vehicle based on the determination result of the collision determination unit 318. The photoelectric conversion system 300 is also connected to an alert device 340 that issues an alert to the driver based on the determination result of the collision determination unit 318. For example, when the determination result of the collision determination unit 318 indicates that the possibility of collision is high, the control ECU 330 performs vehicle control to avoid collision and reduce damage by, for example, applying a brake, returning an accelerator, or suppressing engine output. The alert device 340 gives an alert to the user by sounding an alarm such as a sound, displaying alert information on a screen of a car navigation system or the like, giving vibration to a seat belt or a steering wheel, or the like.

In the present embodiment, an image of the surroundings of the vehicle, for example, the front or the rear is captured by the photoelectric conversion system 300. FIG. 21B illustrates the photoelectric conversion system in the case of capturing an image in front of the vehicle (imaging range 350). The vehicle information acquisition device 320 sends an instruction to the photoelectric conversion system 300 or the imaging device 310. With such a configuration, the accuracy of distance measurement may be further improved.

Although an example in which control is performed so as not to collide with another vehicle has been described above, the present invention is also applicable to control in which automatic driving is performed so as to follow another vehicle, control in which automatic driving is performed so as not to protrude from a lane, and the like. Further, the photoelectric conversion system is not limited to a vehicle such as an own vehicle, and may be applied to, for example, other movable objects (mobile devices), such as a ship, an aircraft, or an industrial robot. In addition, the present invention is not limited to the movable object, and may be widely applied to equipment using object recognition, such as ITS (Intelligent Transport Systems).

Eighth Embodiment

Figure 22:
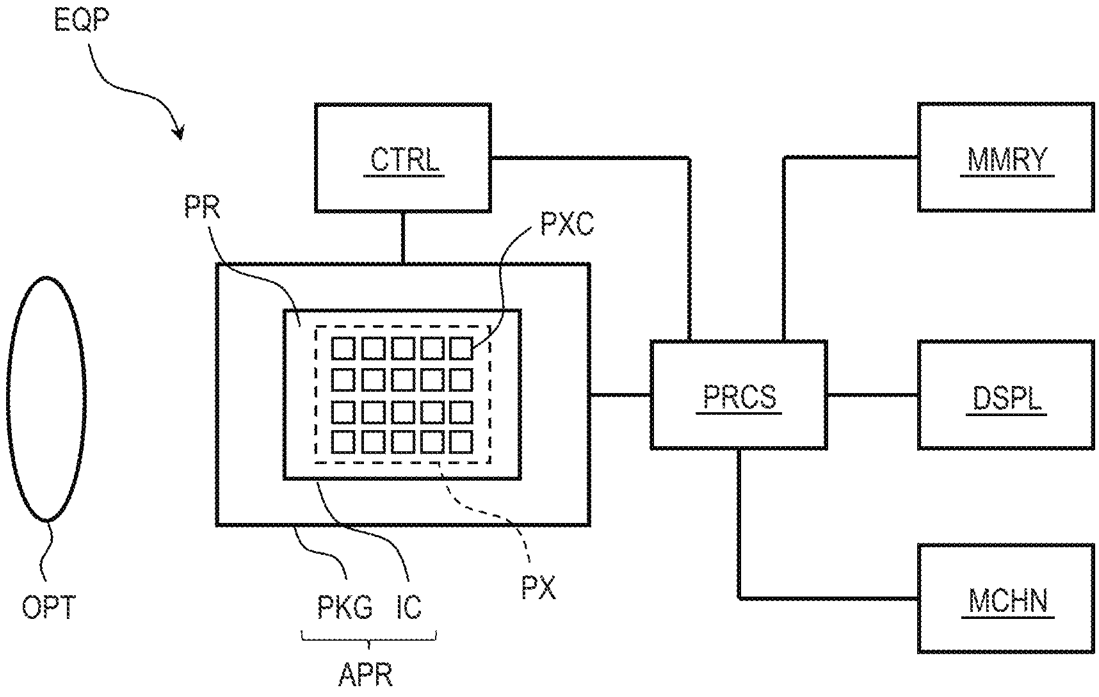
FIG. 22 is a block diagram illustrating a schematic configuration of equipment according to an eighth embodiment.

An equipment according to an eighth embodiment of the present invention will be described with reference to FIG. 22. FIG. 22 is a block diagram illustrating a schematic configuration of an equipment according to the present embodiment.

FIG. 22 is a schematic diagram illustrating an equipment EQP including the photoelectric conversion device APR. The photoelectric conversion device APR has the function of the photoelectric conversion device 100 according to any of the first to fifth embodiments. All or part of the photoelectric conversion device APR is a semiconductor device IC. The photoelectric conversion device APR of the present example may be used as, for example, an image sensor, an AF (Auto Focus) sensor, a photometric sensor, or a distance measurement sensor. The semiconductor device IC includes a pixel region PX in which pixel circuits PXC each including photoelectric conversion unit are arranged in a matrix. The semiconductor device IC may include a peripheral region PR around the pixel region PX. A circuit other than the pixel circuit may be disposed in the peripheral region PR.

The photoelectric conversion device APR may have a structure (chip stacked structure) in which a first semiconductor chip provided with a plurality of photoelectric conversion units and a second semiconductor chip provided with peripheral circuits are stacked. Each of the peripheral circuits in the second semiconductor chip may be column circuits corresponding to pixel columns of the first semiconductor chip. The peripheral circuits in the second semiconductor chip may be matrix circuits corresponding to pixels or pixel blocks in the first semiconductor chip. As the connection between the first semiconductor chip and the second semiconductor chip, a through electrode (TSV (Through Silicon Via)), an inter-chip interconnection by direct bonding of a conductor such as copper, a connection by a micro bump between chips, a connection by wire bonding, or the like may be employed.

The photoelectric conversion device APR may include a package PKG that accommodates the semiconductor device IC in addition to the semiconductor device IC. The package PKG may include a base body to which the semiconductor device IC is fixed, a lid body such as glass facing the semiconductor device IC, and connection members such as bonding wires or bumps for connecting terminals provided on the base body and terminals provided on the semiconductor device IC.

The equipment EQP may further include at least one of an optical device OPT, a control device CTRL, a processing device PRCS, a display device DSPL, a storage device MMRY, and a mechanical device MCHN. The optical device OPT corresponds to the photoelectric conversion device APR as a photoelectric conversion device, and is, for example, a lens, a shutter, or a mirror. The control device CTRL controls the photoelectric conversion device APR, and is, for example, a semiconductor device such as an ASIC (Application Specific Integrated Circuit). The processing device PRCS processes a signal output from the photoelectric conversion device APR and constitutes an AFE (Analog Front End) or a DFE (Digital Front End). The processing unit PRCS is a semiconductor device such as a CPU (Central Processing Unit) or an ASIC. The display device DSPL may be an EL (electroluminescent) display device or a liquid crystal display device that displays information (image) obtained by the photoelectric conversion device APR. The storage device MMRY may be a magnetic device or a semiconductor device that stores information (image) obtained by the photoelectric conversion device APR. The storage device MMRY may be a volatile memory such as an SRAM or a DRAM, or a nonvolatile memory such as a flash memory or a hard disk drive. The mechanical device MCHN may include a movable portion or a propulsion portion such as a motor or an engine. In the equipment EQP, a signal output from the photoelectric conversion device APR is displayed on the display device DSPL or transmitted to the outside by a communication device (not illustrated) included in the equipment EQP. Therefore, it is preferable that the equipment EQP further includes a storage device MMRY and a processing device PRCS separately from the storage circuit unit and the arithmetic circuit unit included in the photoelectric conversion device APR.

The equipment EQP illustrated in FIG. 22 may be an electronic device such as an information terminal (for example, a smartphone or a wearable terminal) having a photographing function or a camera (for example, an interchangeable lens camera, a compact camera, a video camera, and a monitoring camera). The mechanical device MCHN in the camera may drive components of the optical device OPT for zooming, focusing, and shutter operation. The equipment EQP may be a transportation device (movable object) such as a vehicle, a ship, or an airplane. The equipment EQP may be a medical device such as an endoscope or a CT scanner.

The mechanical device MCHN in the transport device may be used as a mobile device. The equipment EQP as a transport device is suitable for transporting the photoelectric conversion device APR, or for assisting and/or automating operation (manipulation) by an imaging function. The processing device PRCS for assisting and/or automating driving (manipulation) may perform processing for operating the mechanical device MCHN as a movable device based on information obtained by the photoelectric conversion device APR.

The photoelectric conversion device APR according to the present embodiment may provide a high value to a designer, a manufacturer, a seller, a purchaser, and/or a user thereof. Therefore, when the photoelectric conversion device APR is mounted on the equipment EQP, the value of the equipment EQP may also be increased. Therefore, in manufacturing and selling the equipment EQP, it is advantageous to determine the mounting of the photoelectric conversion device APR of the present embodiment on the equipment EQP in order to increase the value of the equipment EQP.

Modified Embodiments

The present invention is not limited to the above-described embodiments, and various modifications are possible.

For example, an example in which a part of the configuration of any of the embodiments is added to another embodiment or an example in which a part of the configurations of any of the embodiments is substituted with some of the configurations of another embodiment is also an embodiment of the present invention.

One or both of the transfer transistor M1 and the select transistor M4 may be omitted from the transistors provided in the pixel 12. When the select transistor M4 is omitted, the selection state and the non-selection state of the pixel 12 may be switched by providing a plurality of reset potentials of the node FD. That is, by setting the potential of the node FD so that the gate-source voltage Vgs of the amplifier transistor M3 becomes lower than the threshold voltage of the amplifier transistor M3, the pixel 12 may be brought into the non-selected state. On the other hand, by setting the potential of the FD so that the gate-source voltage Vgs of the amplifier transistor M3 exceeds the threshold voltage of the amplifier transistor M3, the pixel 12 may be set to the selected state. Further, more transistors may be provided in the pixel 12. For example, in the case where the pixel 12 performs global shutter operation, a transistor that is connected to the photoelectric conversion element PD and controls reset operation of the photoelectric conversion element PD is provided. Further, a holding portion that holds charge and a transistor that switches connection and disconnection between the photoelectric conversion element PD and the holding portion are further provided between the photoelectric conversion element PD and the transfer transistor M1. Such a structure of the pixel 12 may be employed.

In the first to fifth embodiments, a stacked-type photoelectric conversion device in which two substrates are bonded has been described, but the number of substrates constituting the photoelectric conversion device is not limited to two and may be three or more. For example, a memory substrate having a memory may be provided separately from the substrates of the pixel substrate 110 and the signal processing substrate 140, and these substrates may be stacked in any order. Even in a stacked-type photoelectric conversion device in which three or more substrates are bonded together, the same effects as those of these embodiments may be obtained by separately forming the standard signal output circuit 34 and the standard signal output circuit 36 on appropriate substrates as in the present embodiment. The pixels 12 may be separately provided on a plurality of substrates. For example, the photoelectric conversion element PD may be disposed on one substrate (third substrate) and the pixel circuit 17 may be disposed on another substrate (first substrate). The third substrate and the first substrate are electrically connected to each other. For this electrical connection, for example, the above-described TSV (Through Silicon Via) technique may be used, or metal bonding between metals (Cu—Cu bonding) may be used. This dividing method is merely an example, and the pixels 12 may be divided into three or more substrates. That is, the photoelectric conversion device may have three or more layers in which two or more pixel substrates and one or more signal processing substrates are stacked. In any case, the standard signal output circuit 36 is disposed on the substrate on which the amplifier transistor M3 of the pixel 12 is disposed. That is, in each embodiment, the standard signal output circuit 36 may be disposed on the substrate on which the pixel circuit 17 is disposed.

FIG. 7 illustrates an FSI-type photoelectric conversion device in which the pixel substrate 110 and the signal processing substrate 140 are bonded to each other in a face-to-back manner so that the second face 124 and the first face 152 face to each other. However, a BSI-type photoelectric conversion device in which the pixel substrate 110 and the signal processing substrate 140 are bonded to each other in a face-to-back manner so that the first face 122 and the second face 154 face to each other may be also configured. In this case, the pixel substrate 110 and the signal processing substrate 140 are electrically connected to each other via a through electrode provided to penetrate the semiconductor substrate 150.

Further, in the first to fifth embodiments, an example in which the present invention is applied to a photoelectric conversion device having a ramp-type AD converter or a delta-sigma-type AD converter has been described, but the AD converter included in the photoelectric conversion device does not necessarily need to be a ramp-type AD converter or a delta-sigma-type AD converter. The present invention may be applied not only to a photoelectric conversion device having a ramp-type AD converter or a delta-sigma-type AD converter, but also to a photoelectric conversion device having another AD converter such as a successive approximation AD converter.

Although an example in which the reference signal output circuit 48 provided inside the photoelectric conversion device generates the reference signal rmp is described in each of the embodiment, the present invention is not limited to this example. For example, a reference signal rmp generated outside the photoelectric conversion device may be input to the reference signal output circuit 48, and the reference signal output circuit 48 may output the reference signal rmp after buffering the reference signal rmp.

Although an example in which the standard signal output circuit 34 provided inside the photoelectric conversion device generates the standard signal is described in each of the embodiments, the present invention is not limited to this example. For example, a standard signal generated outside the photoelectric conversion device may be input to the standard signal output circuit 34, and the standard signal output circuit 34 may output the standard signal after buffering the standard signal.

The photoelectric conversion systems described in the sixth and seventh embodiments are examples of photoelectric conversion systems to which the photoelectric conversion device of the present invention may be applied, and the photoelectric conversion system to which the photoelectric conversion device of the present invention may be applied is not limited to the configuration illustrated in FIG. 20 and FIG. 21A.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-203225, filed Nov. 30, 2023, and Japanese Patent Application No. 2024-160779, filed Sep. 18, 2024, which are hereby incorporated by reference herein in their entirety.

What is claimed is:

1. A photoelectric conversion device comprising:

a first substrate;

a second substrate bonded to the first substrate;

a plurality of pixel circuits provided on the first substrate so as to form a plurality of columns, each of the plurality of pixel circuits being configured to output a signal based on charge generated by photoelectric conversion;

a plurality of column circuits provided on the second substrate, each of the plurality of column circuits being configured to perform a gain processing on an output signal from the corresponding pixel circuit;

a standard signal output unit provided on the second substrate and configured to output a standard signal according to the gain processing;

a connection portion electrically connecting the first substrate and the second substrate;

a signal output unit including an amplifier circuit provided on the first substrate; and a signal processing unit configured to process an output signal of the column circuit, wherein the signal output unit is configured to output a signal based on the standard signal input from the standard signal output unit via the connection portion to the plurality of column circuits via the amplifier circuit, wherein the signal processing unit is configured to correct a gain error of the column circuit superimposed on an output signal of the column circuit when an output signal of the pixel signal is input, using an output signal of the column circuit when an output signal of the signal output unit is input, and wherein the signal processing unit is configured to correct the gain error using a ratio between the output signal of the signal output unit when the standard signal of a first level is input and the output signal of the signal output unit when the standard signal of a second level different from the first level is input.

2. The photoelectric conversion device according to claim 1, further comprising a reference signal output unit provided on the second substrate and configured to output a reference signal whose level changes with time, wherein each of the plurality of column circuits includes a comparator configured to compare the output signal of the pixel circuit with the reference signal and is configured to perform an analog-to-digital conversion of the output signal of the pixel circuit with a gain according to a time change rate of a level of the reference signal.

3. The photoelectric conversion device according to claim 2, wherein the standard signal output unit is configured to set a level of the standard signal according to the time change rate.

4. The photoelectric conversion device according to claim 2, wherein the reference signal output unit includes a first reference signal output circuit configured to output a first reference signal and a second reference signal output circuit configured to output a second reference signal having the time change rate different from that of the first reference signal, and wherein each of the plurality of column circuits is configured to select one of the first refence signal and the second reference signal as the reference signal to be compared with the output signal of the pixel circuit according to a level of the output signal of the pixel circuit.

5. The photoelectric conversion device according to claim 1, wherein each of the plurality of column circuits includes a column amplifier configured to amplify the output signal of the pixel circuit, and wherein the standard signal output unit is configured to set a level of the standard signal according to a gain of the column amplifier.

6. The photoelectric conversion device according to claim 5, wherein each of the plurality of column circuit is configured to set a gain of the column amplifier according to a level of the output signal of the pixel circuit.

7. The photoelectric conversion device according to claim 1, wherein each of the plurality of column circuits includes an oversampling-type AD converter that performs analog-to digital conversion based on the output signal of the pixel circuit.

8. The photoelectric conversion device according to claim 1, wherein the connection portion comprises a plurality of connection portions, and wherein the standard signal output unit and the signal output unit are electrically connected to each other via the plurality of connection portions.

9. The photoelectric conversion device according to claim 1, wherein the standard signal output unit includes a plurality of standard signal output circuits each configured to output the standard signal, and wherein a plurality of standard signals output by the plurality of standard signal output circuits is input to the signal output unit via the connection portions different from each other.

10. The photoelectric conversion device according to claim 1, further comprising a pad electrode provided on the second substrate to which a wiring is connected through an opening penetrating the first substrate.

11. The photoelectric conversion device according to claim 1, further comprising a pad electrode provided on the first substrate, wherein the pad electrode is electrically connected to the second substrate via a connection portion different from the connection portion electrically connecting the standard signal output unit and the signal output unit.

12. The photoelectric conversion device according to claim 1, wherein each of the first substrate and the second substrate includes a metal interconnection as an uppermost-level interconnection layer, and wherein the connection portion is configured by a metal bonding of metal members constituting the metal interconnections.

13. The photoelectric conversion device according to claim 1, wherein the connection portion includes a through electrode provided to penetrate a semiconductor substrate constituting the first substrate or the second substrate.

14. The photoelectric conversion device according to claim 1, further comprising a plurality of photoelectric conversion units each of which generates charge, wherein the plurality of photoelectric conversion units is provided on the first substrate.

15. The photoelectric conversion device according to claim 1, further comprising a plurality of photoelectric conversion units each of which generates charge, wherein the plurality of photoelectric conversion units is provided on a third substrate, and the third substrate and the first substrate are electrically connected to each other.

16. A photoelectric conversion system comprising:

the photoelectric conversion device according to claim 1; and a signal processing device configured to process a signal output from the photoelectric conversion device.

17. A movable object comprising:

the photoelectric conversion device according to claim 1;

a distance information acquisition unit configured to acquire distance information to an object from a parallax image based on a signal from the photoelectric conversion device; and a control unit configured to control the movable object based on the distance information.

18. An equipment comprising:

the photoelectric conversion device according to claim 1; and at least one of an optical device corresponding to the photoelectric conversion device, a control device configured to control the photoelectric conversion device, a processing device configured to process a signal output from the photoelectric conversion device, a mechanical device that is controlled based on information obtained by the photoelectric conversion device, a display device configured to display information obtained by the photoelectric conversion device, and a storage device configured to store information obtained by the photoelectric conversion device.

19. A photoelectric conversion device comprising:

a first substrate;

a second substrate bonded to the first substrate;

a plurality of pixel circuits provided on the first substrate so as to form a plurality of columns, each of the plurality of pixel circuits being configured to output a signal based on charge generated by photoelectric conversion;

a plurality of column circuits provided on the second substrate, each of the plurality of column circuits being configured to perform a gain processing on an output signal from the corresponding pixel circuit;

a standard signal output unit provided on the second substrate and configured to output a standard signal according to the gain processing;

a connection portion electrically connecting the first substrate and the second substrate; and a signal output unit including an amplifier circuit provided on the first substrate, wherein the signal output unit is configured to output a signal based on the standard signal input from the standard signal output unit via the connection portion to the plurality of column circuits via the amplifier circuit, and wherein the signal output unit is configured to limit a voltage operation amplitude of the output signal of the pixel circuit input to the column circuit by an output signal when the standard signal is input.

20. A photoelectric conversion device comprising:

a first substrate;

a second substrate bonded to the first substrate;

a plurality of pixel circuits provided on the first substrate so as to form a plurality of columns, each of the plurality of pixel circuits being configured to output a signal based on charge generated by photoelectric conversion;

a plurality of column circuits provided on the second substrate, each of the plurality of column circuits being configured to perform a gain processing on an output signal from the corresponding pixel circuit;

a standard signal output unit provided on the second substrate and configured to output a standard signal according to the gain processing;

a connection portion electrically connecting the first substrate and the second substrate; and a signal output unit including an amplifier circuit provided on the first substrate, wherein the signal output unit is configured to output a signal based on the standard signal input from the standard signal output unit via the connection portion to the plurality of column circuits via the amplifier circuit, wherein each of the plurality of pixel circuits further includes a first amplifier transistor configured to amplify a signal corresponding to an amount of charge generated by a photoelectric conversion unit, wherein the signal output unit includes a plurality of second amplifier transistors provided corresponding to the plurality of columns and each configured to amplify the standard signal and output to the column circuit of the corresponding column, and wherein a size of the first amplifier transistor and a size of the second amplifier transistor are the same.

* * * * *